(12) United States Patent
Grossman et al.

(10) Patent No.: US 12,126,299 B2
(45) Date of Patent: Oct. 22, 2024

(54) SOLAR COLLECTOR CLEANING DEVICE

(71) Applicant: NOVASOURCE POWER OPCO, INC., Wilmington, DE (US)

(72) Inventors: Marc Grossman, Davis, CA (US); Devin Cameron Castellucci, Woodland, CA (US); Cedric Jeanty, Davis, CA (US); Juan Sanchez-Garcia, Woodland, CA (US); Erik Cummins, Sacramento, CA (US); Michael Coresetto, Davis, CA (US)

(73) Assignee: NOVASOURCE POWER OPCO, INC., Wilmington, DE (US)

( * ) Notice: Subject to any disclaimer, the term of this patent is extended or adjusted under 35 U.S.C. 154(b) by 177 days.

(21) Appl. No.: 17/668,734

(22) Filed: Feb. 10, 2022

(65) Prior Publication Data

US 2022/0166375 A1 May 26, 2022

Related U.S. Application Data

(60) Continuation-in-part of application No. 16/117,802, filed on Aug. 30, 2018, now Pat. No. 11,258,401, and a continuation-in-part of application No. 16/114,898, filed on Aug. 28, 2018, now abandoned, and a (Continued)

(51) Int. Cl.
| | |
|---|---|
| *H02S 40/10* | (2014.01) |
| *B08B 1/10* | (2024.01) |
| *B08B 1/12* | (2024.01) |
| *B08B 1/14* | (2024.01) |
| *B08B 1/16* | (2024.01) |
| *B08B 1/32* | (2024.01) |
| *B08B 3/02* | (2006.01) |
| *B08B 3/04* | (2006.01) |
| *F24S 25/00* | (2018.01) |
| *F24S 40/20* | (2018.01) |

(52) U.S. Cl.
CPC .............. *H02S 40/10* (2014.12); *B08B 1/10* (2024.01); *B08B 1/12* (2024.01); *B08B 1/143* (2024.01); *B08B 1/165* (2024.01); *B08B 3/024* (2013.01); *B08B 3/04* (2013.01); *F24S 25/00* (2018.05); *F24S 40/20* (2018.05); *B08B 1/32* (2024.01); *Y02E 10/40* (2013.01)

(58) Field of Classification Search
None
See application file for complete search history.

(56) References Cited

U.S. PATENT DOCUMENTS

2012/0125367 A1* 5/2012 Monkman .............. B08B 1/04
15/250.04

* cited by examiner

*Primary Examiner* — Natasha N Campbell
*Assistant Examiner* — Pradhuman Parihar
(74) *Attorney, Agent, or Firm* — The Small Patent Law Group LLC; Christopher R. Carroll

(57) ABSTRACT

An autonomous solar collector cleaning device includes at least one main shaft, a first driver attached to a first end of the at least one main shaft, and a second driver attached to a second end of the at least one main shaft. The first and second drivers propel the cleaning device along a surface of the solar collector. A first sensor is attached to the first driver to detect an edge of the solar collector, and a second sensor is attached to the second driver to detect the edge of the solar collector. A control circuit maintains alignment of the cleaning device with respect to the solar collector based on outputs from the first and second sensors.

12 Claims, 31 Drawing Sheets

Related U.S. Application Data division of application No. 14/339,370, filed on Jul. 23, 2014, now abandoned.

(60) Provisional application No. 62/552,021, filed on Aug. 30, 2017, provisional application No. 62/007,381, filed on Jun. 3, 2014.

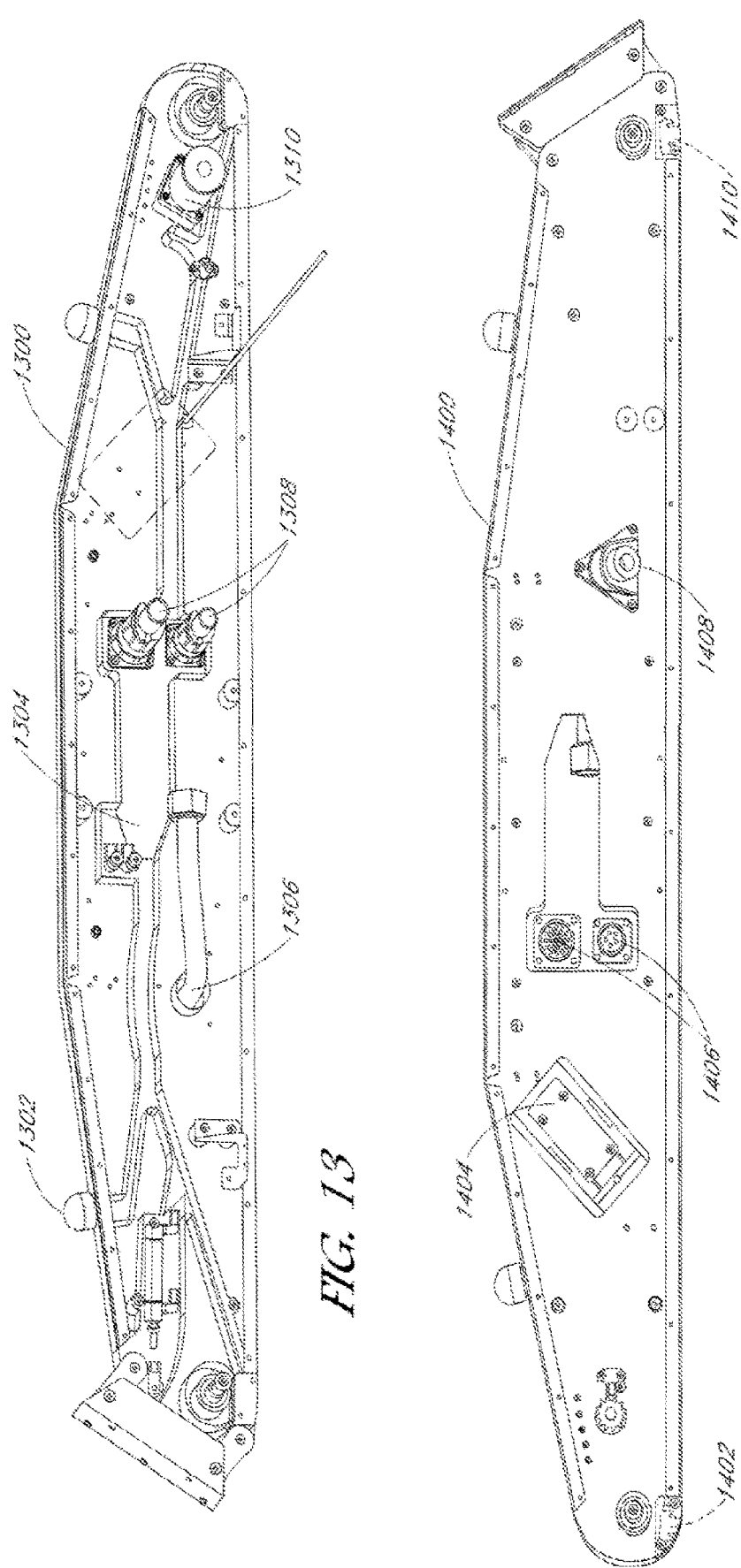

SOLAR COLLECTOR CLEANING DEVICE

CROSS-REFERENCE TO RELATED APPLICATIONS

This application is a continuation-in-part of U.S. patent application Ser. No. 16/117,802 (filed 30 Aug. 2018, now U.S. Pat. No. 11,258,401), which is a divisional of U.S. patent application Ser. No. 14/339,370 (filed 23 Jul. 2014), which claims priority to U.S. Provisional Application No. 62/007,381 (filed 3 Jun. 2014).

This application also is a continuation-in-part of U.S. patent application Ser. No. 16/114,898 (filed 28 Aug. 2018), which claims priority to U.S. Provisional Application No. 62/552,021 (filed 30 Aug. 2017).

The entire disclosures of these applications are incorporated herein by reference.

BACKGROUND

Technical Field

The subject matter described herein relates to cleaning devices for solar modules or solar collector devices.

Discussion of Art

Photovoltaic (PV) cells, commonly known as solar cells, solar modules, or solar collector devices, may be used for conversion of solar radiation into electrical energy. Solar cells may be fabricated on semiconductor wafers or substrates using semiconductor processing techniques to form p-n junctions near surfaces of the substrates. Solar radiation impinging on the surface of, and entering into, the substrate may create electron and hole pairs in the bulk of the substrate. The electron and hole pairs migrate to p-doped and n-doped regions in the substrate, thereby generating a voltage differential between the doped regions. The doped regions are connected to conductive regions on the solar cell to direct an electrical current from the cell to an external circuit. Solar cells can be coupled together electrically (e.g., in series) to form a solar, or PV, module.

In the field, PV modules can collect dust, dirt, or other particulates, which can block some amount of solar radiation, which can ultimately reduce the amount of energy produced by the PV module.

BRIEF DESCRIPTION

One example of a solar collector cleaning device may include a main shaft extending along a longitudinal axis. The main shaft may include a cleaning member that engages and cleans an upper surface of a solar collector. The cleaning device may include a first driver attached to the main shaft and a second driver attached to the main shaft. The first driver and the second driver may engage the solar collector and propel the first driver, the second driver, and the main shaft along the solar collector while the cleaning member engages and cleans the upper surface of the solar collector. The cleaning device may include sensors attached to the first driver and the second driver. The sensors may detect one or more edges of the solar collector. The cleaning device may include a control unit that may receive output from the sensors indicating detection of the one or more edges of the solar collector. The control unit may change operation of the first driver, the second driver, or both the first driver and the second driver in response to receiving the output from the sensors.

One example of a method for controlling a solar collector cleaning device may include controlling speeds at which a first driver and a second driver connected to a main shaft of the solar collector cleaning device move along an upper surface of a solar collector. The first driver and the second driver may be attached to a main shaft extending along a longitudinal axis. The method also may include engaging and cleaning the upper surface of the solar collector using a cleaning member of the main shaft while the first driver and the second driver move the cleaning device along the upper surface of the solar collector, and receiving output from sensors attached to the first driver and the second driver at a control unit. The output from the sensors may indicate detection of one or more edges of the solar collector. The method also may include changing operation of the first driver, the second driver, or both the first driver and the second driver in response to receiving the output from the sensors.

One example of a solar collector cleaning device may include a shaft, a cleaning member coupled with the shaft that may clean an upper surface of a solar collector, drivers attached to the shaft that may engage the solar collector to propel the cleaning member along the upper surface of the solar collector, sensors that may detect one or more edges of the solar collector, and a control unit that may receive output from the sensors indicating detection of the one or more edges of the solar collector. The control unit may change operation of the drivers in response to receiving the output from the sensors.

BRIEF DESCRIPTION OF THE DRAWINGS

The subject matter may be understood from reading the following description of non-limiting embodiments, with reference to the attached drawings, wherein below:

FIGS. 13 through 15 illustrate example end plates for drive modules of a robotic cleaner;

DETAILED DESCRIPTION

Figure 1:
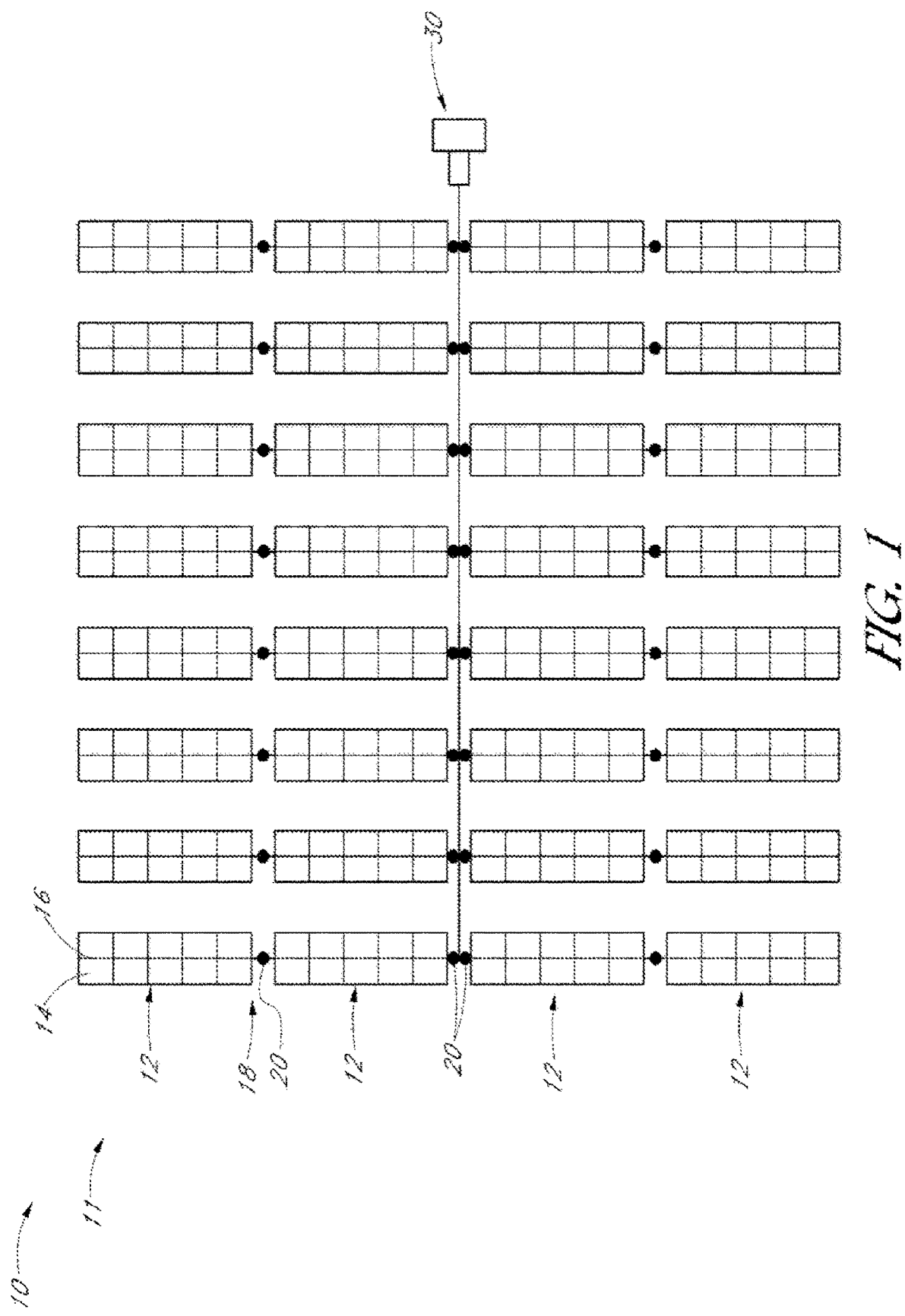
FIG. 1 is a schematic top plan view of one example of a solar collector system.

The following detailed description is merely illustrative in nature and is not intended to limit all embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary, or the following detailed description. This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component "configured to" perform one or more tasks is expressly intended not to invoke 35 U.S.C. § 112(f) for that unit/component.

"First," "Second," etc. As used herein, these terms are used as labels for nouns that they precede, and do not imply any type of ordering (e.g., spatial, temporal, logical, etc.). For example, reference to a "first" drive module of a PV module cleaner does not necessarily imply that this drive module is the first drive module in a sequence; instead the term "first" is used to differentiate this drive module from another drive module (e.g., a "second" drive module).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled" The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit" As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or, eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

A PV module robotic cleaner and methods of operating a robotic cleaner are described herein. In the following description, numerous specific details are set forth, such as specific structures and operations, to provide a thorough understanding of embodiments of the present disclosure. It will be apparent to one skilled in the art that embodiments of the present disclosure may be practiced without these specific details. In other instances, well-known structures or techniques are not described in detail to not unnecessarily obscure embodiments of the present disclosure. Moreover, some details of a robotic cleaner are described in commonly owned U.S. Pat. No. 10,111,563, entitled "Mechanism for Cleaning Solar Collector Surfaces" by Grossman et al., filed on 18 Jan. 2013, which is hereby incorporated by reference in its entirety. Furthermore, it is to be understood that the various embodiments shown in the figures are illustrative representations and are not necessarily drawn to scale.

This specification first describes an example robotic cleaner, followed by detailed descriptions of various components of the robotic cleaner followed by example methods of using the cleaner. Various examples are provided throughout.

Turning now to the Figures, FIG. 1 is a schematic illustration of a solar collection system 10, which can be a concentrating or non-concentration (i.e., one sun) system.

The solar collection system 10 can include a solar collector array 11 which includes a plurality of solar collection modules 12. Each of the solar collection modules 12 can include a plurality of solar collecting devices 14 supported by a drive shaft or torque tube 16. Each of the torque tubes 16 are supported above the ground by a support assembly 18. Each of the support assemblies 18 can include a bearing assembly 20. As such, the torque tubes 16 can be considered as pivots supporting the modules 12.

With continued reference to FIG. 1, the system 10 can also include a tracking system 30 connected to the torque tubes 16 and configured to pivot the torque tube 16 so as to cause the associated collector devices 14 to track the movement of the sun. In the illustrated embodiment, the torque tubes 16 are arranged generally horizontal and the modules 12 are electrically connected to each other. The tracking system can include a single motor and drive components adapted to drive a plurality of parallel torque tube assemblies (e.g., assemblies comprising a series of axially aligned torque tubes connected end-to-end), or a plurality of motors, each connected one or a plurality of axially aligned torque tubes 16.

Optionally, the system 10 can include a plurality of modules 12 supported by torque tubes 16 that are inclined relative to horizontal, where the torque tubes 16 are not connected in an end-to-end fashion. Further, the system can provide for controlled tilting about two axes, although not illustrated herein.

The solar collection devices 14 can be in the form of photovoltaic panels/modules, thermal solar collection devices, concentrated photovoltaic devices, or concentrated thermal solar collection devices.

As described herein, the light receiving surfaces of solar collection devices can accumulate dirt, dust, or other particulates (e.g., airborne particulates) that can block light that would otherwise be incident on the collector surface. Such accumulation can reduce the potential power output of the solar collector(s).

Figure 2:
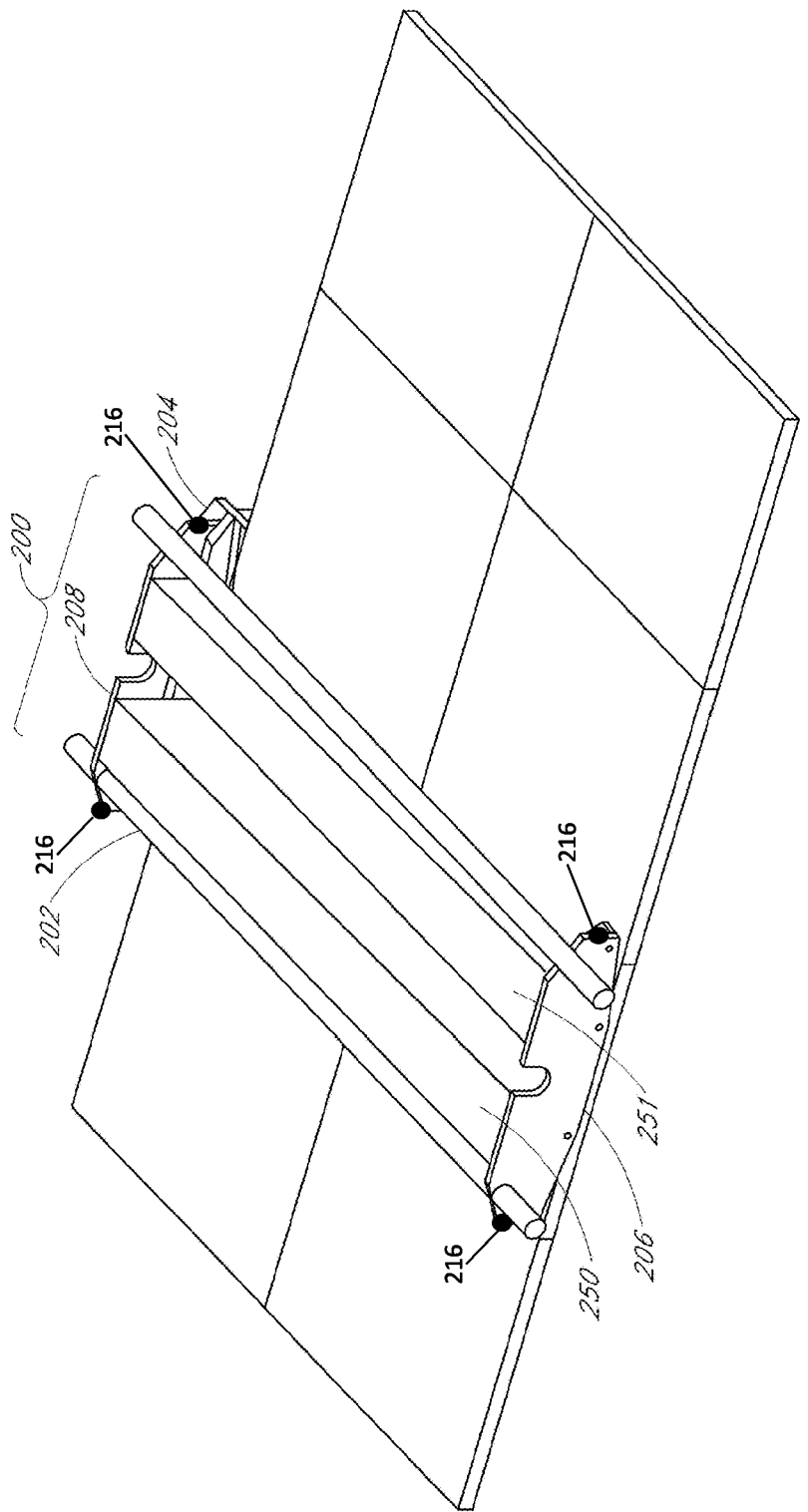
FIG. 2 illustrates an example robotic cleaning device.

One way to improve power output is to clean the collector surface of the solar collector. FIG. 2 depicts an example robotic cleaning device for cleaning solar collectors. The robotic cleaning device 200 depicted in FIG. 2 is configured to clean a row of solar collectors by traversing across the collector surface of the array of solar collectors and by crossing gaps between adjacent solar collectors. Although illustrated as covering multiple solar collectors at a time, in some embodiments, the robotic cleaning device can be sized to accommodate a single solar collector at a given time.

The robotic cleaning device 200 can include one or more cleaning modules 250 and 251 for cleaning the collector surfaces of the array of solar collectors. As used herein, the term cleaning module is used interchangeably with the term cleaning head. The cleaning modules can include one or more components for removing accumulated particulate from the collector surface of a solar collector. Example cleaning modules 250 and 251, featuring a dual-squeegee configuration, are discussed in more detail below with respect to FIG. 4. However, in other embodiments, robotic cleaning device 200 may not include a dual-squeegee configuration, such as a zero, one, or more than two squeegee configuration.

Figure 3:
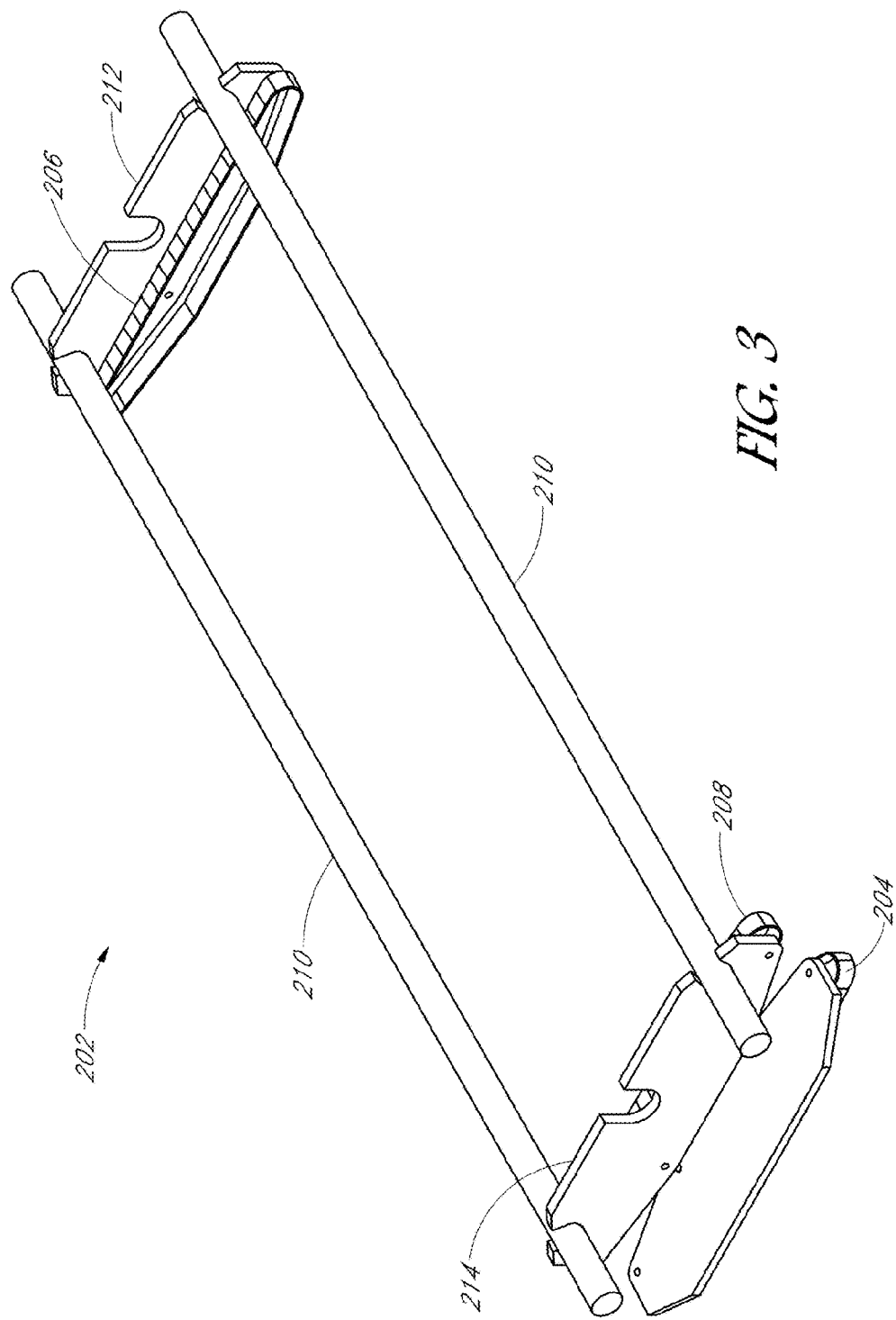
FIG. 3 illustrates an example frame of a robotic cleaning device.

As depicted in the examples of FIGS. 2 and 3, the robotic cleaning device 200 can include an upper guide mechanism 204 configured to traverse along an edge (e.g. upper edge when the solar collectors are in a tilted configuration) of the array of solar collectors. In general, the first guide mechanism 204 can inhibit the robotic cleaning device from sliding off the inclined solar collector array and can assist in positioning the robotic cleaning device 200. In this example, the first guide mechanism 204 includes a continuous track belt having a flattened region for contacting the upper edge of an array of solar collectors. The leading and trailing ends of the track belt can be beveled at an angle to assist in transitioning the robotic cleaning device 200 across gaps between solar collectors. In one embodiments, the leading and/or trailing ends of the belt may not be beveled. In some embodiments, the guide mechanism can include a row of rollers (e.g., polyurethane, etc.) having a diameter sufficiently large to roll across gaps between adjacent solar collectors.

In the illustrated embodiment, the upper guide mechanism 204 is mechanically coupled to the frame 202 that supports the components used to clean the collector surface of the solar collector. In this example, the frame 202 is joined to the upper guide mechanism 204 via a pivot joint that allows the frame 202 to rotate with respect to the upper edge of the solar collector. In other embodiments, the upper guide mechanism 204 is rigidly jointed to the frame 202.

In some embodiments, the robotic cleaning device 200 can be positioned along the array of solar collectors using two continuous track mechanisms. The frame 202 can include a front continuous track mechanism 206 disposed at the front, lower edge of the array of solar collectors and a rear continuous track mechanism 208 disposed at the rear, upper edge of the array of solar collectors. Each continuous track mechanism 204, 206, 208 can include an independently controllable drive motor configured to drive a continuous track belt in either direction. The robotic cleaning device 200 can be steered by, for example, driving the two continuous track mechanisms 206, 208 at different speeds with respect to each other. In some cases, drive for the upper guide mechanism 204 is electrically or mechanically coupled to the drive of either the front or rear continuous track mechanisms 206, 208. In some cases, the upper guide mechanism 204 does not include a drive and is a free-rolling mechanism.

As shown in FIG. 2, the continuous track mechanisms 206, 208 can each contact the collector surface via a continuous track belt having a flattened region. In some embodiments, the continuous track mechanisms 206, 208 can also have a beveled lead and trail portions to assist in traversing the gaps between adjacent solar collectors. In particular, the beveled lead and trail portions of the continuous track mechanisms 206, 208 can help convey the robotic cleaning device 200 over gaps between adjacent solar collectors that are at different heights.

The robotic cleaning device 200 can include sensors 216 (e.g., two, four, six, etc.) configured to detect the gap between adjacent solar collectors. The sensors can be used to provide positional feedback for the robotic cleaning device 200. In one embodiment, the sensors are configured to detect gaps between adjacent solar collectors and can also detect the edge of a solar collector array. The sensors can also be used to prevent the robotic cleaning device 200 from driving past the end of the solar collector array and can also be used to reverse direction of movement, as described herein. For example, the sensors can be optical sensors, infrared sensors, cameras, or the like, that can detect changes in light or appearances within a field of view of the sensors. Based on these changes, the sensors (or a controller that receives output from the sensors) can identify edges of the solar collectors. As one example, during a time period that the sensor is disposed over the solar collector, the sensor output may indicate a first amount or a first color of light detected by the sensor. When the sensor is no longer over the solar collector (e.g., is past the edge of the solar collector), the sensor output may change to indicate a different, second amount of light and/or a different, second color of light. This change can represent or indicate that the sensor 216 (and, by connection, the cleaning device 200) has reached an edge of the solar collector.

In one embodiment, the sensors are used to maintain the orientation of the robotic cleaning device 200 with respect to the array of solar collectors. For example, two optical sensors may be positioned toward the front and rear ends of the frame 202, respectively. Each optical sensor may produce a characteristic response signal when the sensor passes over a gap between adjacent solar collectors indicating a detection of the gap. The timing difference between the front and rear sensor response signals may indicate the orientation of the robotic cleaning device 200 with respect to the array of solar collectors. For example, the robotic cleaning device 200 may be oriented on the array of solar collectors with the lower, front end of the device leading the upper, rear end of the device. In this configuration, the front sensor will detect a gap between adjacent solar collectors before the rear sensor detects the same gap. The timing between the response signals of the two sensors indicates the relative angle of the robotic cleaning device 200 with respect to the array of solar collectors.

The sensors may also be used for purposes other than gap detection. In some implementations, the optical sensor may identify the location of the robotic cleaning device 200 along the array of solar collectors. For example, the optical sensors may detect a location marker or other optical fiducial that represents a known location along the array of solar collectors. The optical sensors may also be used to sense an identification mark on the collector surface indicating a serial number or other form of equipment identification. The sensors may also be used to estimate the quantity of particulate that has accumulated on the collector surface and help determine whether cleaning is necessary and how much cleaning should be performed.

Although much of the preceding description focused on optical sensors, other sensors can also be used including, without limitation, proximity sensors, capacitive sensors, inductive sensors, Hall Effect sensors, limit switches, mechanical sensors, and the like. In some embodiments, the sensors are configured to detect changes in material near the collector surface. For example, the sensor may be configured to detect changes from the glass surface of the collector surface to the metal frame around the collector panel perimeter.

FIG. 3 depicts the frame 202 of robotic cleaning device 200 without the cleaning modules. Note that the orientation of the flame 202 is rotated with respect to the view depicted in FIG. 2. As shown in FIG. 3, the frame includes an upper guide mechanism 204 disposed near the rear portion of the frame 202 for traversing the upper edge of a solar collector array. The frame also includes front and rear continuous track mechanisms 206, 208 disposed near the front and rear ends of the frame 702, respectively.

As shown in FIG. 3, the front and rear continuous track mechanisms 206, 208 are attached to end plates 212, 214. The end plates 212, 214 are structurally joined by two lateral beams 210. The end plates 212, 214 may be attached to the lateral beams 210 by a clamping mechanical interface that allows the plates to be unclamped and moved along the length of the lateral beams 210 to change the distance between the upper and lower continuous track mechanisms 206, 208. In this way, the robotic cleaning device 200 may be configured to fit a variety of differently sized solar collectors.

In some embodiments, the frame 202 may include one or more integrated, onboard liquid reservoirs for storing cleaning liquid (e.g., water) or other liquids used for cleaning the collector surface. For example, one or both lateral beams 210 may be formed from a hollow tube structure that is sealed at both ends to provide a sealed internal cavity. The internal cavity may be used to store the cleaning liquid used in the cleaning operations. In some embodiments, the end plates are also formed from a hollow structure (e.g., a box structure) that is sealed and can also be used as a liquid reservoir.

Figure 4:
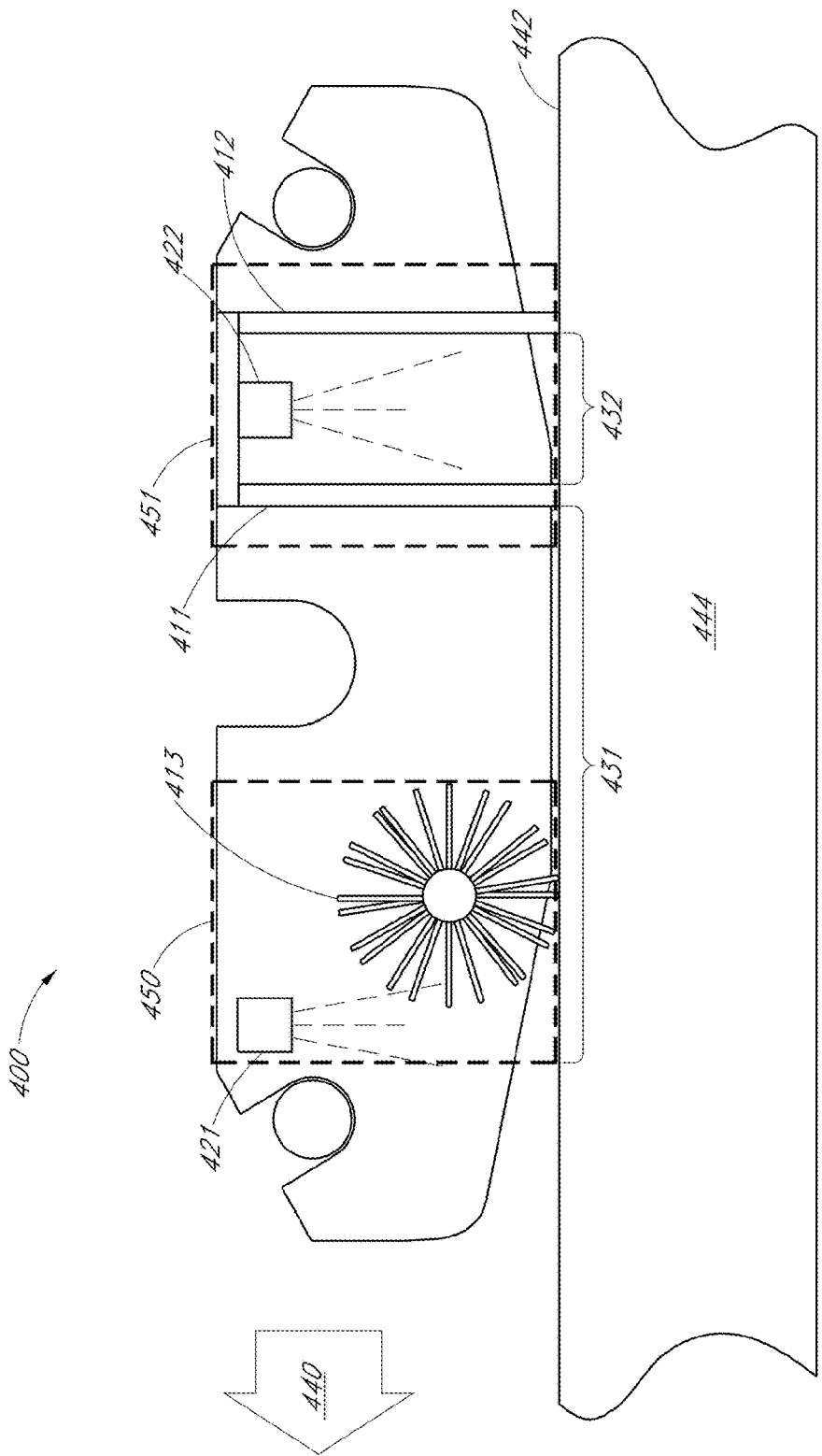
FIGS. 4 and 5 illustrate schematic diagrams of example cleaning modules for a robotic cleaner.

As previously mentioned, a robotic cleaning device can include one or more cleaning modules for cleaning the collector surfaces of the array of solar collectors. FIG. 4 depicts a schematic diagram of example cleaning modules 450 and 451 that can be integrated into the frame of a robotic cleaning device 400.

As shown in FIG. 4, cleaning module 450 includes a brush element 413 and a first liquid-dispensing unit 421. The brush element 413 has a longitudinal side oriented along a first direction substantially perpendicular to the drive direction 440. Cleaning module 451 includes a first squeegee element 411 and a second squeegee element 412 separated by a gap. A second liquid-dispensing unit 422 is disposed in the gap between the first squeegee element 411 and the second squeegee element 412. A cleaning liquid can be applied to the collector surface 442 of the solar collector 444 using the first and/or second liquid-dispensing unit 421, 422.

In this example, as the robotic cleaning device 400 is moved across the collector surface 442 in a drive direction 440, two cleaning areas are created: a low-dilution area 431 and a high-dilution area 432. As shown in FIG. 4, the low-dilution area 431 precedes the high-dilution area 432 as the robotic cleaning device 400 is moved in the drive direction 440. As the robotic cleaning device 400 is driven, the first squeegee element 411 acts as a liquid barrier and separates the low-dilution area 431 from the high-dilution area 432.

As shown in FIG. 4, the low-dilution area 431 corresponds to a portion of the collector surface 442 near the first liquid-dispensing unit 421, a portion of the collector surface 442 under the brush element 413, and extends toward the first squeegee element 411. In some embodiments, the first liquid-dispensing unit 421 delivers a first spray to a dry area of the collector surface 442. After being wetted by the first liquid-dispensing unit 421, the brush element 413 is used to dislodge particulate material that has accumulated on the collector surface 442 of the solar collector 444. As a result, the liquid present in the low-dilution area 431 typically contains a relatively high concentration of particulate material suspended in a volume of cleaning liquid. As the robotic cleaning device 400 is driven across the collector surface 442, a large portion of the cleaning liquid and suspended particulate material are removed by the first squeegee 411.

As shown in FIG. 4, the high-dilution area 432 is located on a side of the first squeegee element 411 opposite to the low-dilution area 431 and includes the area between the first squeegee element 411 and the second squeegee element 412. In a typical implementation, the high-dilution area 432 corresponds to the portion of the collector surface 442 that is being wetted by the cleaning liquid a second time. Accordingly, the cleaning liquid present in the high-dilution area 432 typically contains a lower concentration of particulate suspended in a volume of cleaning liquid as compared to the concentration of suspended particulate in the low-dilution area 431. As the robotic cleaning device 400 is driven across the collector surface 442, nearly all of the liquid and suspended particulate material is removed by the second squeegee element 412. If the solar collector 444 is installed on an incline, the liquid and suspended particulate material removed by the second squeegee element 412 may drain from the high-dilution area 432 by gravity. In some embodiments, the removed liquid may be collected and rerouted back to the first liquid-dispensing units.

As shown in FIG. 4, the brush element 413 may be a rotating brush having bristles extending radially from a central shaft or rod. In some embodiments, the bristles of the rotating brush may be arranged in a helical pattern down the length of the central shaft or rod. The helical arrangement of the bristles may generally push the cleaning liquid on the collector surface 442 toward one end of the robotic cleaning device 400 using an auger motion. If the robotic cleaning device 400 is installed on an inclined solar collector, the helical arrangement of bristles may auger or push the cleaning liquid up the incline as the brush is rotated. This configuration helps prevent the cleaning liquid from draining off the collector surface too quickly and may allow the robotic cleaning device 400 to dean the collector surface using a lower quantity of cleaning liquid.

FIG. 4 depicts one exemplary arrangement of cleaning modules 450 and 451. However, in some embodiments the cleaning modules are integrated into a single cleaning module/head, such as in the example of FIG. 5. Additionally, the cleaning modules may be configured to be manually or automatically lifted from the collector surface 442 to allow the robotic cleaning device 400 to traverse over gaps between adjacent solar collectors, such as PV trackers 1802 and 1804 of FIG. 18, or other obstructions.

As another example, in some embodiments, the robotic cleaning device can be configured to move in a first, reverse direction across a row of PV panels (and optionally apply a pre-soak liquid) with the cleaning module in an up, disengaged position. The robotic cleaning device can be configured to change directions at the end of the row to a second, forward direction. When traversing the row in the forward direction, the robotic cleaning device can be configured to apply the cleaning module in an engaged position. Note that, in one embodiment, even when the cleaning module is disengaged, at least a portion of the cleaning head (e.g., brush 513) may still contact the PV panel(s) to provide a coarse cleaning.

The robotic cleaning device 400 may also be configured for bi-directional operation. For example, a dual-squeegee cleaning module similar to module 451 may be arranged on either side of a brush cleaning module similar to module 450. One of the dual-squeegee cleaning modules may be manually or automatically lifted from the collector surface 442, depending on the direction of travel.

Figure 5:
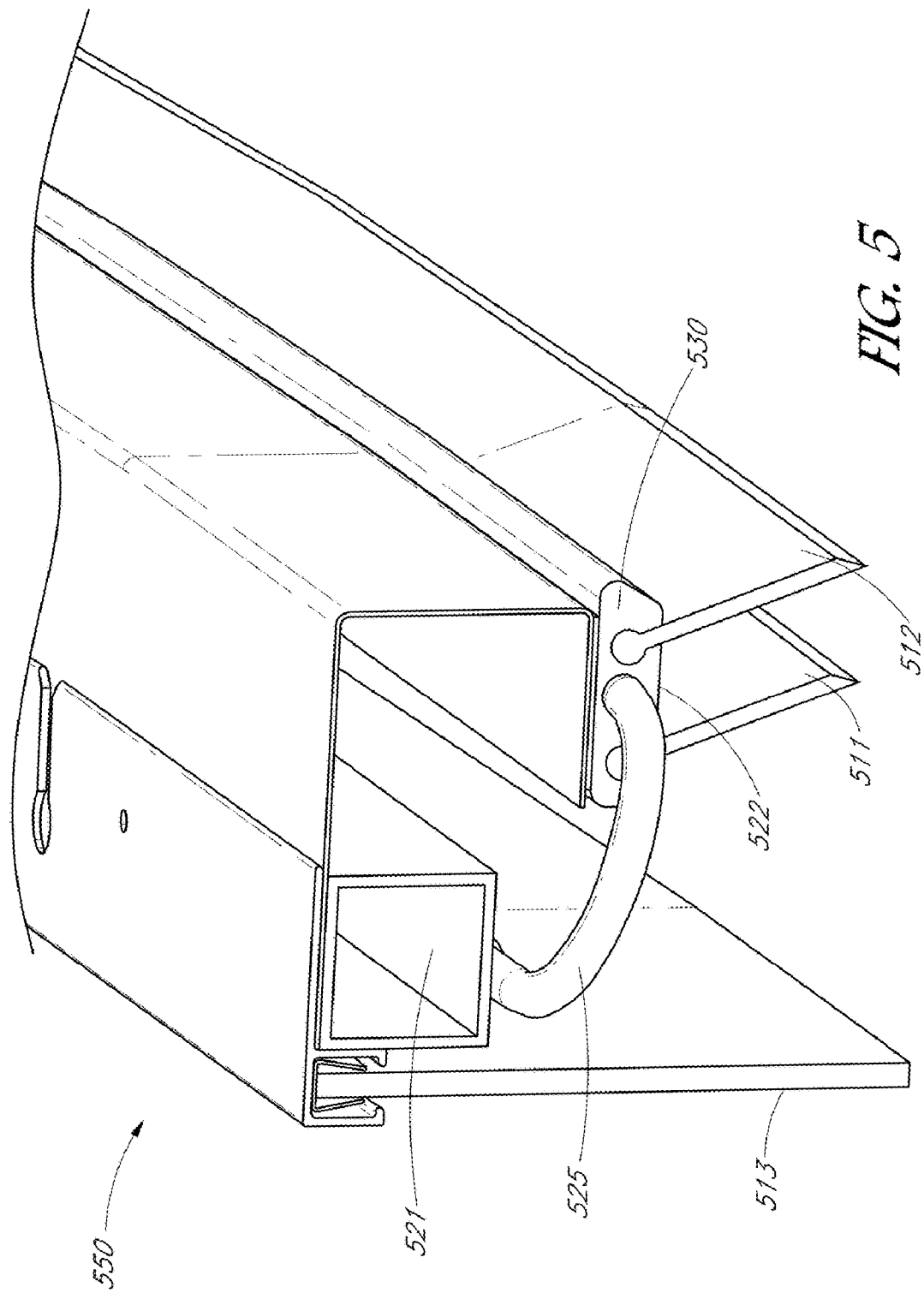

FIG. 5 illustrates another example cleaning module, according to various embodiments, as viewed from above and slightly behind. Note that some or all of the description of cleaning modules 450 and 451 at FIG. 4 can apply to the cleaning module 550 of FIG. 5. In one embodiment, squeegee elements 511 and 512 can be made of silicon or some other rubber. Squeegee elements 511 and 512 can be slideably coupled (as shown) or otherwise coupled to squeegee holder extrusion 530, which can be coupled to a bracket of the cleaning module. In some embodiments, the squeegee holder extrusion can be integrated into the bracket such that the squeegees are directly coupled to the bracket.

Cleaning module 550 can also include a brush element 513, such as a strip brush (as shown) or a rotating brush as in FIG. 4. In various embodiments, brush element 513 can be disposed such that its lowest point is lower than the lowest points of squeegee elements 511 and 512 and therefore makes contact with the PV module even when cleaning module 550 is positioned at a first, higher position (disengaged position) relative to the module without the squeegee elements making contact with the PV module. At a second position (engaged position) of the cleaning module 550 relative to the PV module, both the brush and squeegees can make contact with the PV modules.

Figure 7:
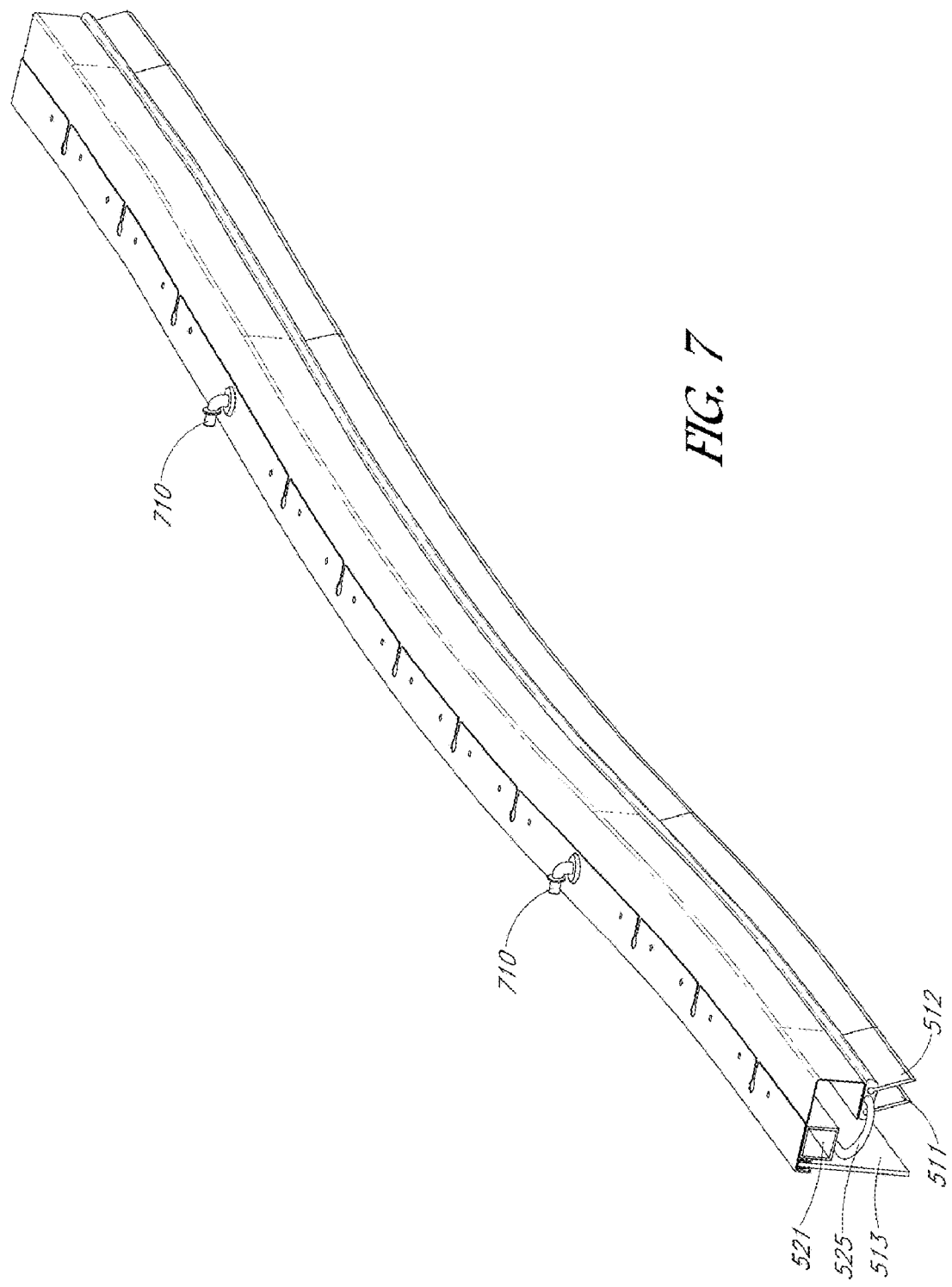
FIGS. 7 and 8 illustrate example forward curvature cleaning modules for a robotic cleaner.

In one embodiment, cleaning module 550 can include water sprayer rail 521 that includes a plurality of holes through which water and/or cleaning solution can be sprayed. Water sprayer rail 521 can be coupled to squeegee holder extrusion via supply line 525 and squeegee holder extrusion 530 can likewise include a plurality of holes through which water and/or cleaning solution can be sprayer. FIG. 7 illustrates ports 710 that can be used to provide water/cleaning solution to cleaning module 550.

In some instances, the top most surface of a PV module may not be flat. For example, the center of the glass section in a typical PV module can sag about 4-5 mm under its own weight when the module is in the horizontal plane. In contrast, the edges of the PV module may not exhibit the same sag as the center resulting in a slightly bowl-shaped module. Embodiments described herein can provide better cleaning for such modules that exist in the field.

In one embodiment, the squeegee(s) can be supple enough to achieve a sufficient line pressure (e.g., approximately 15 Newtons per linear meter) across, the surface of the glass (e.g., in both the middle of the module where it sags and at the edges where it does not sag as much). For example, the spring constant of the squeegee can be low enough that the squeegee deflects more in the high points of the glass and less in the low points but allowing the line pressure to be substantially uniform because the deflection of the squeegee requires little load. The term substantially uniform pressure is used herein to describe a generally consistent line pressure in the middle and edges of the module. The squeegee edge that is in contact with the module surface during operation can include a sharp tip, as shown in the lower edge (glass contacting edge) of squeegee elements 511 and 512. The sharp tip can result in a thinned-out portion of the squeegee that contacts the glass, which can help it conform to the slightly textured module surface.

Figure 6:
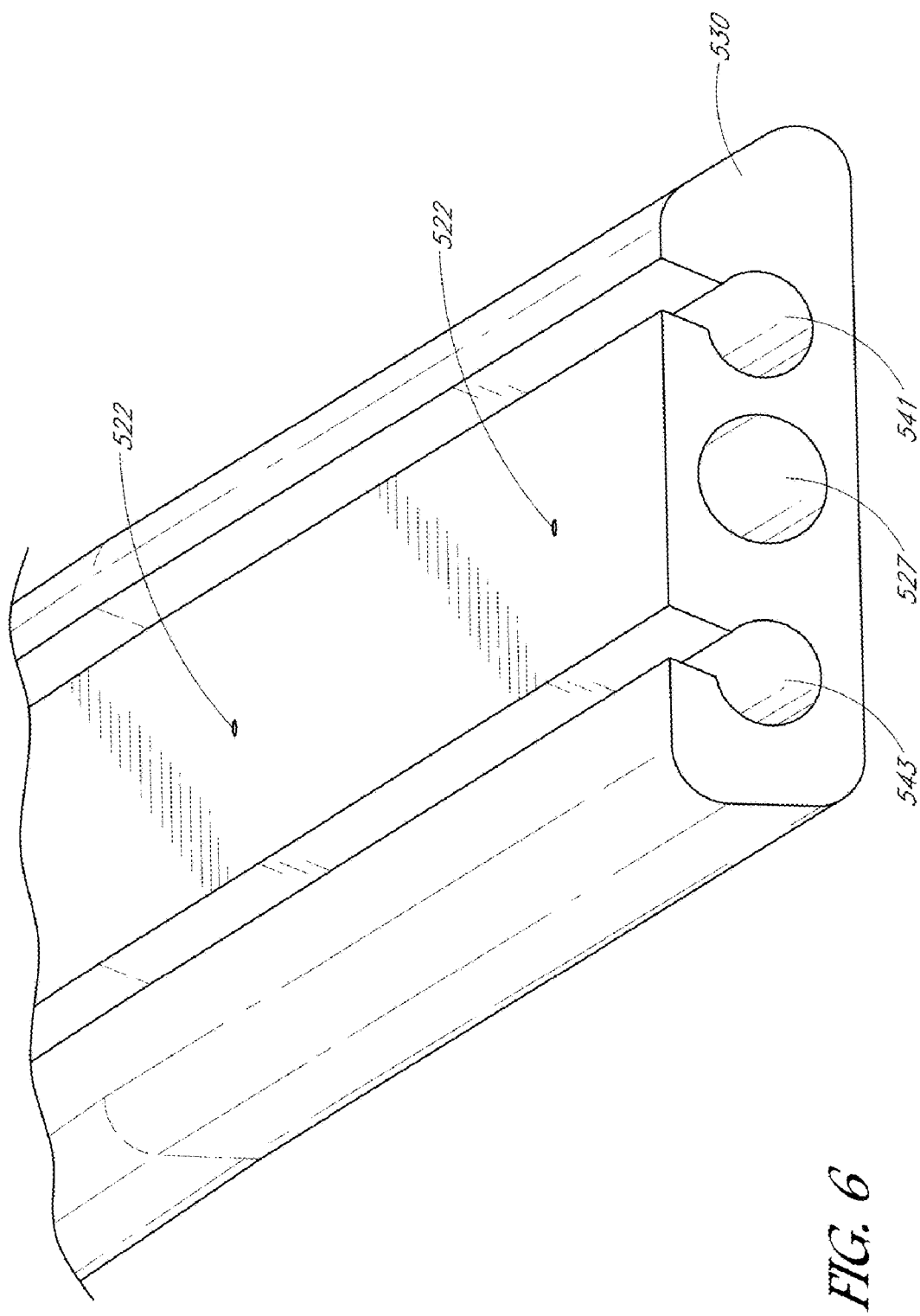
FIG. 6 illustrates a portion of an example cleaning module for a robotic cleaner.

As illustrated in FIG. 5 and also in FIG. 6, the squeegees can easily be replaced by sliding a bulb-shaped or otherwise shaped top end of the squeegees out of slots 543 and 541, respectively, of holder 530. In one embodiment, the lead (front) squeegee 511 can exhibit quicker wear such that upon replacement, the older trail (rear) squeegee 512 is moved from slot 541 to 543 and a new squeegee is placed in slot 543.

Figure 8:
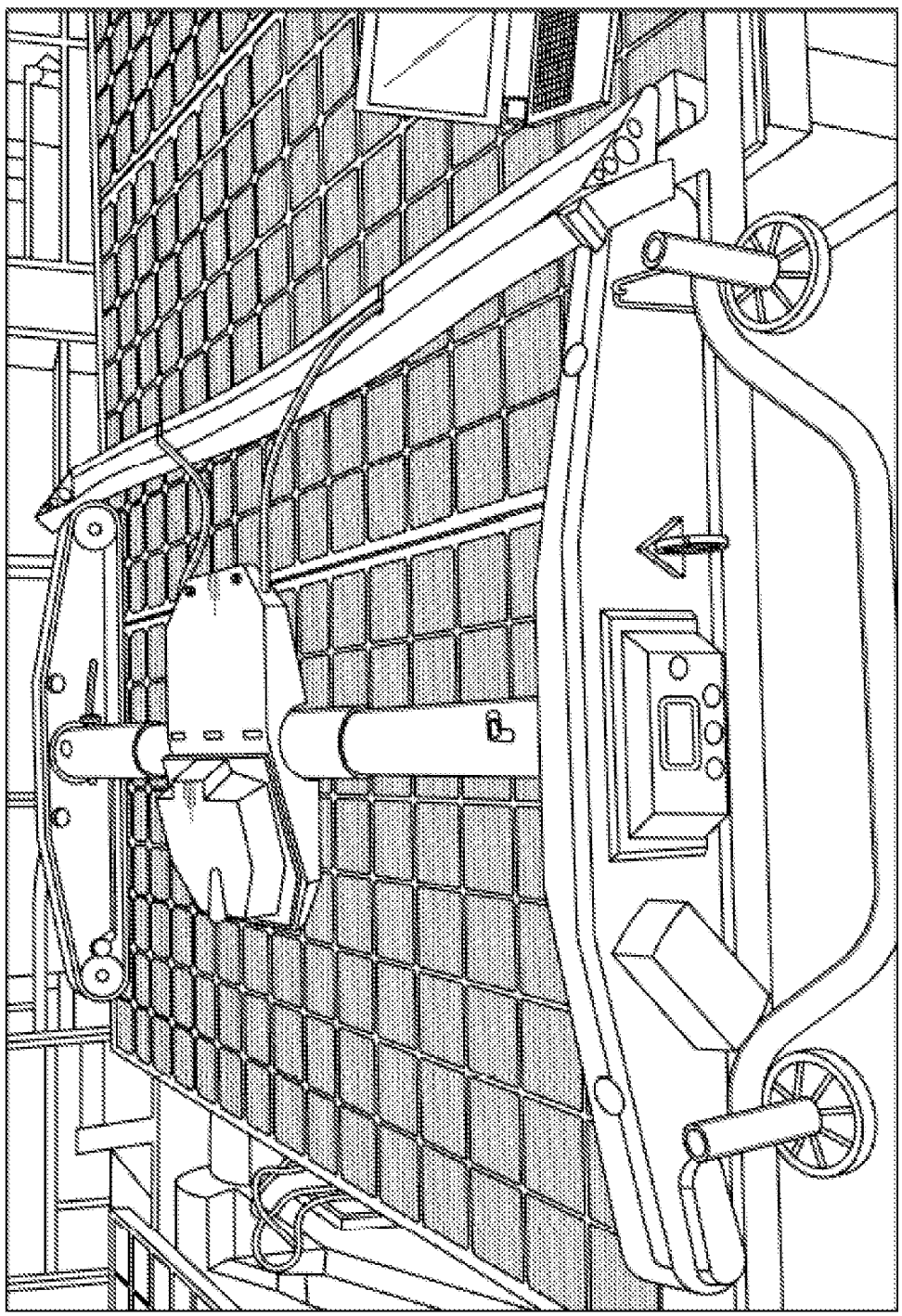

In various embodiments, the curvature of the shape of the cleaning head can also improve cleaning of modules, such as those exhibiting sag. FIGS. 7 and 8 illustrate an example forward curvature of the cleaning head when viewed from above and behind. Forward curvature is used herein to describe a curvature with a middle portion of the cleaning head curved toward the front of the cleaning head (and/or robotic cleaning device) relative to the edge portions of the cleaning head as depicted in FIGS. 7 and 8. The forward curvature of the cleaning head can also provide for similar forward curvature of the brush and squeegee(s), which can allow for the cleaning head, including bristles of the brush, and the squeegees to achieve substantially constant/uniform pressure across the length of the brush despite the sagging middle of the panel. Note that, in one embodiment, as shown in FIG. 8, the cleaning head is only attached to the robotic cleaning device at the ends of the cleaning head and therefore only has direct pressure applied (e.g., by an actuator) at the edges.

Turning to FIG. 8, an example robotic cleaning device with its cover removed is illustrated. As shown, the left side of the depicted robotic cleaning device is its front side and the right side is the rear. The illustrated example includes a cleaning head that is located in the rear of the robotic cleaning device. Similar to the overall cleaning device, the front of the cleaning head as used herein is the left hand side (i.e., the side with the brush) and the right hand side (i.e., the side with the squeegee) is the rear portion or back of the cleaning head. Accordingly, when engaged in cleaning mode, the robot moves toward the left toward the front of the cleaning device such that the brush cleans a particular region of the PV panel before the squeegee does.

Figure 9:
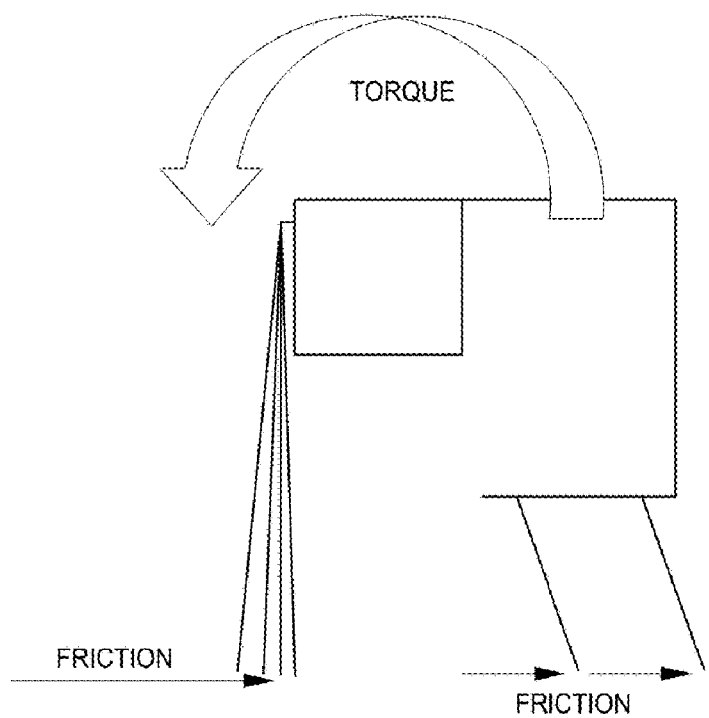
FIG. 9 illustrates a force diagram of a cross-section of an example cleaning head.

FIG. 9 illustrates a three diagram of a cross-section of the disclosed curved cleaning head. As shown, when the cleaning head is lowered into position to make contact with the module when the robot is moving forward, the force of the friction between the bristles and the glass surface as well as the squeegees and the glass surface can impart a torque to the cleaning head. The torque can result in a slight rotation counterclockwise as viewed from this angle. The rotation can result in the center section of the brush being slightly lower than the edges of the brush allowing the brush to apply a substantially uniform force down the entire length even though the downward force is only applied at the edges. Thus, the forward curvature of cleaning head can help maintain sufficient pressure to clean the edges as well as the sagging middle of the PV module.

Figure 10:
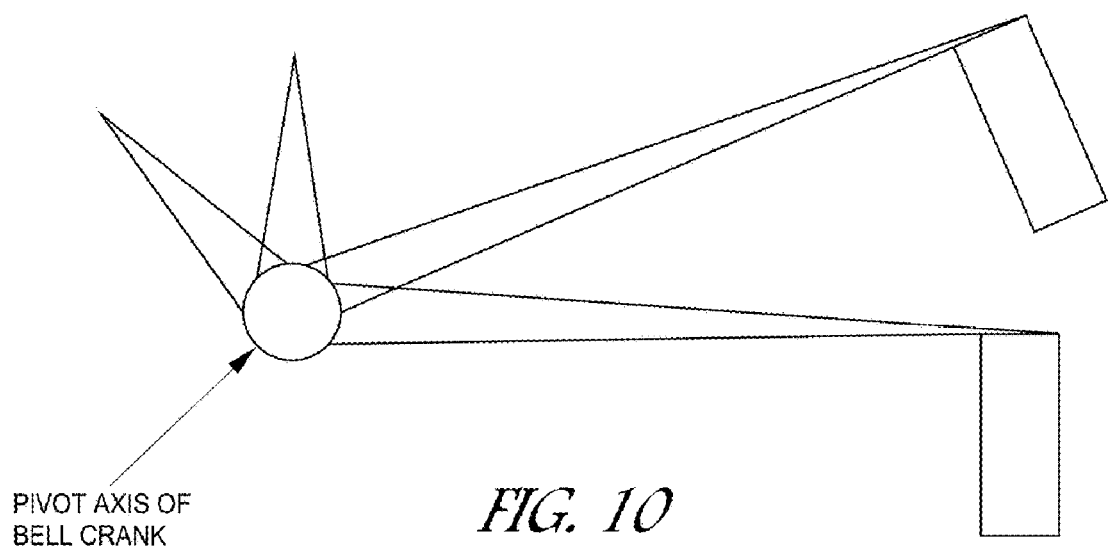
FIG. 10 illustrates an example of a bell-crank actuator.

In various embodiments, the squeegees can be sensitive to the angle of incidence with the glass. For example, in some embodiments, squeegees can operate between approximately 20 and 35 off perpendicular. Using a bell-crank actuator to actuate the cleaning head can make achieving such an angle difficult because bell-crank actuators can allow for both translation and rotation, as shown in FIG. 10. In some instances, if the robot pitches forward or backward (e.g., when climbing from one panel to the next if there is a height difference), a bell-crank actuator based cleaning robot may not work because even if it lowers the cleaning head to make contact with the module e.g., as in a step down situation), it has rotated the squeegee out of its normal orientation.

Figure 11:
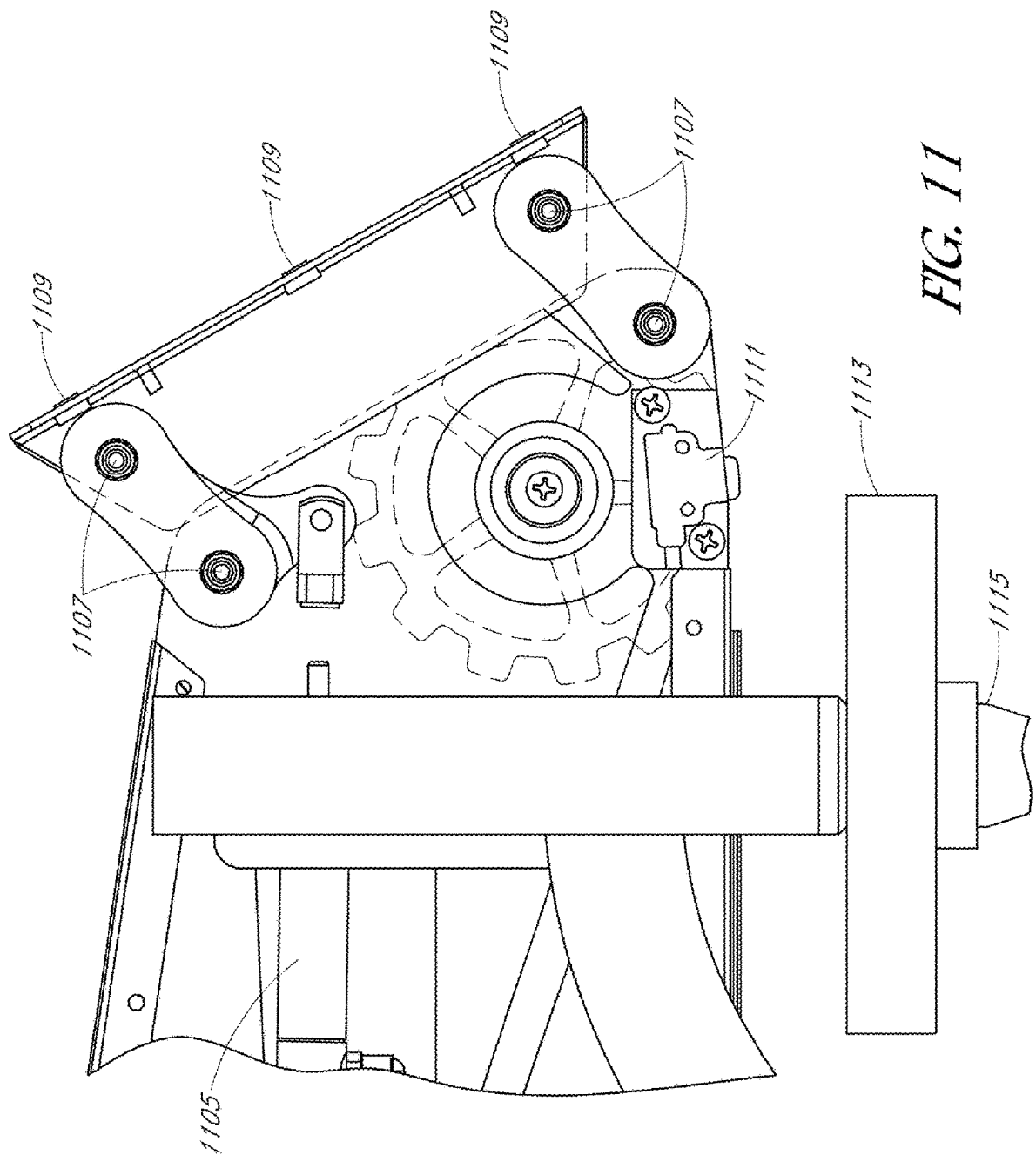
FIGS. 11 and 12 illustrate an example of cleaning head actuation with translation but without rotation.
Figure 12:
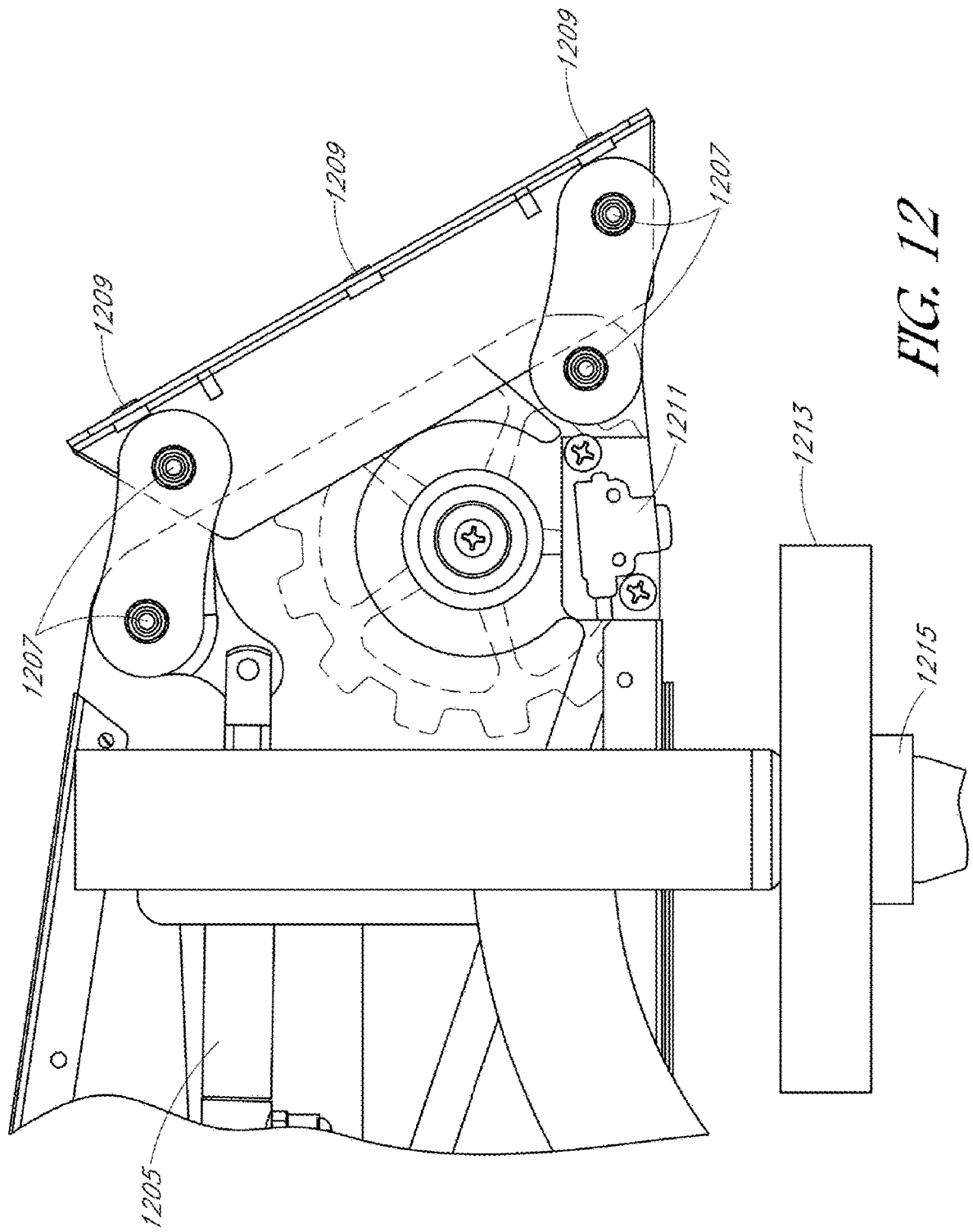

To achieve cleaning head actuation with translation but not rotation, in some embodiments, a parallel linkage mechanism can be used as illustrated at FIGS. 11 and 12. As shown, FIG. 11 illustrates the brush mount bracket of the robotic cleaning device in its up (disengaged) position and FIG. 12 illustrates it in its down (engaged) position. In one embodiment, a pneumatic cylinder 1105/1205 is configured to actuate the cleaning head. As shown between FIGS. 11 and 12, the angle the bracket makes relative to the side of the figure is consistent between the positions shown in FIGS. 11 and 12.

Pivot bolts 1107/1207 can be used as, pivot points for the parallel linkage mechanism and mounting locations 1109/1209 are the points at which the cleaning head is coupled to the actuator. Sensor 1111/1211 can be a proximity sensor (e.g., acoustic sensor, photoelectric sensor, etc.) configured to determine whether a PV module is directly beneath the sensor. Wheel 1113/1213 can be used as a guide to help guide the robotic cleaner over the module. Stacking pin 1115/1215 can be used to stack multiple cleaners together.

Figure 15:
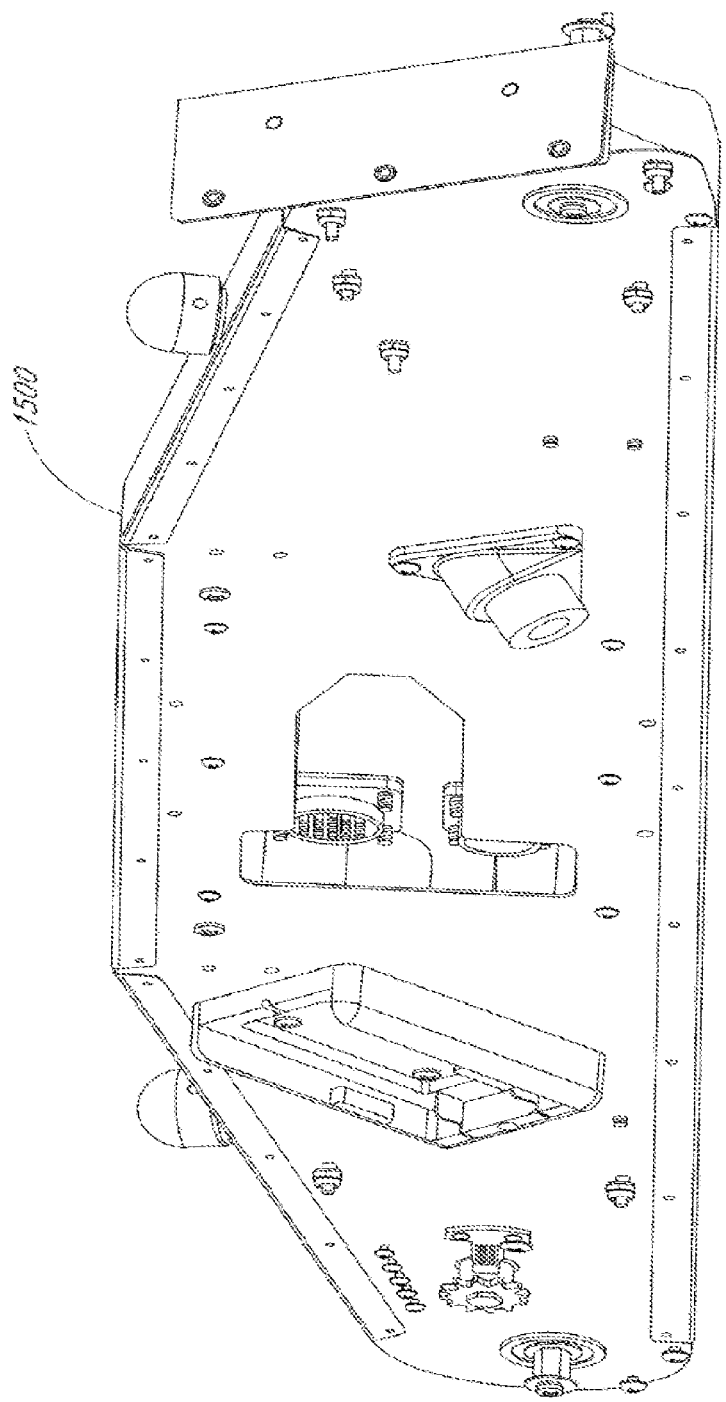

FIGS. 13-15 illustrate example drive modules 1300, 1400, and 1500, according to various embodiments of the cleaner. In some embodiments, a lightweight metal, such as aluminum, foam (e.g., urethane tooling foam), and an injected urethane resign bonded with contact cement can be used to form the end plates. In various embodiments, the foam is routed out in various paths to accommodate routing of wire and hoses (e.g., pneumatic hoses), actuated component(s), sensor(s), and motor(s). FIG. 13 illustrates a transparent view of the aluminum and foam structure of the interior left drive module (right hand side is a mirror of this assembly), showing the anthill like paths with features removed for routing of wire, hose, and internal components. Status light 1302 can be used to provide an indicator of the cleaner's operational status (e.g., low battery, fully operational, low water, out of water, malfunctioning GPS, etc.). As shown, path 1304 can be used to accommodate wiring, tubing, and/or other components. Hose 1306 illustrates a fill hose which comes from the other side of the drive module to a water/solution reservoir. In the illustrated embodiment, ports 1308 can be used to couple drive module electronics to a control board. As illustrated, drive module 1300 also includes at least one drive motor 1310.

FIG. 14 illustrates drive module 1400, which is drive module 1300 as seen from the other side. Sensors 1402 and 1410 can be configured to sense whether the sensors are directly above a portion of a PV module or not (e.g., gap), which can then be used to direct the robotic cleaning device to change directions or correct its course to maintain proper alignment. The end plate of the drive module can also include a battery connector 1404 configured to receive a detachable battery. Ports 1406 illustrate the opposite sides of ports 1308 and water fill port 1408 illustrates a portion of the end plate to which the reservoir can be coupled.

FIG. 15 illustrates end plate 1500 of the drive module with the aluminum layer visible (and hiding the components described at FIGS. 13 and 14).

Figure 16:
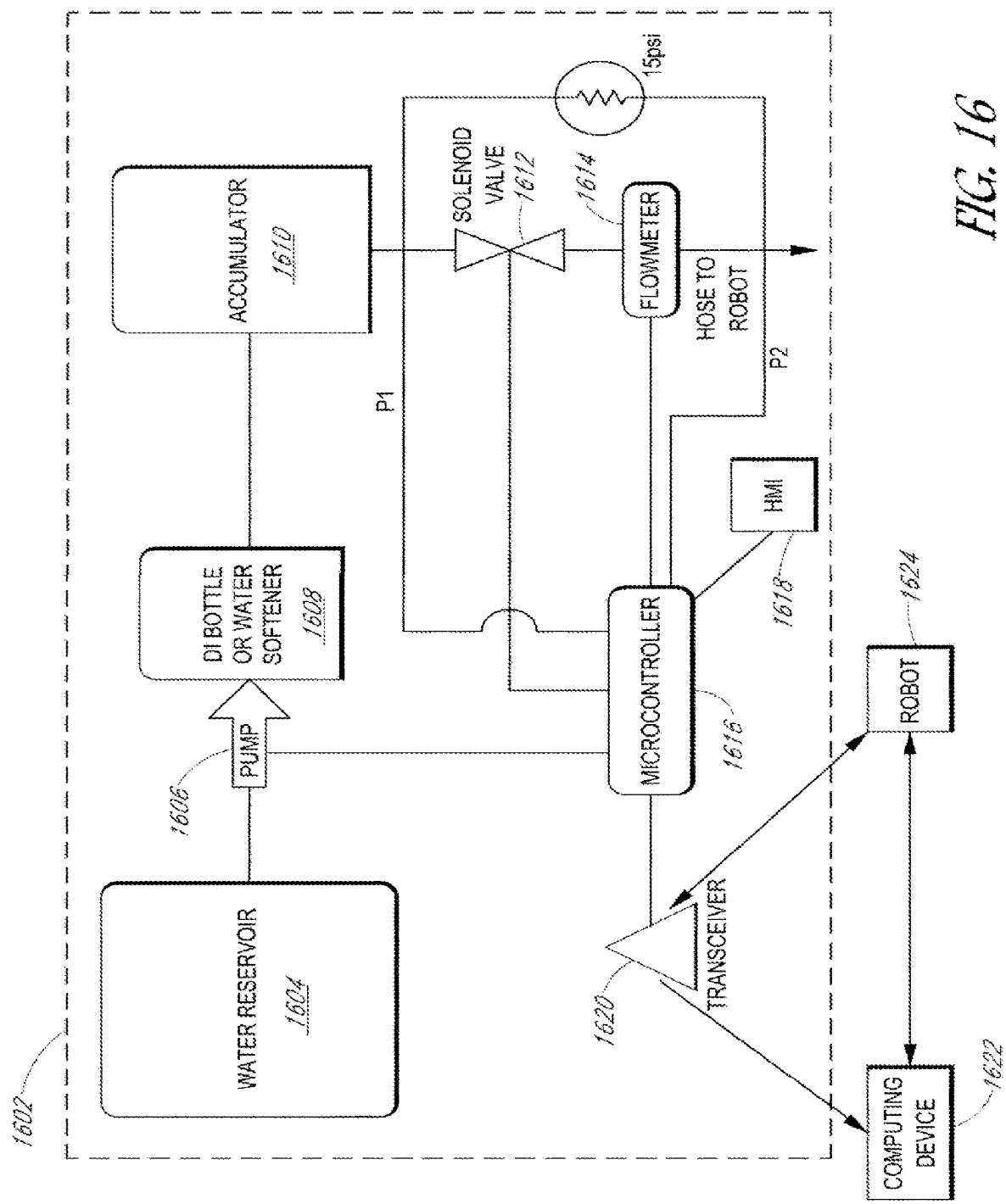
FIG. 16 illustrates an example control system as part of a robotic cleaning system.

FIG. 16 illustrates a portion of a robotic cleaning system, including a support system, cleaning robot, and backend. The support system can provide a variety of roles, such as providing a metered fill of the cleaning robot, among other functions.

In one embodiment, the robotic cleaning device can be configured to monitor the current and/or voltage into a positive displacement pump of the robot. Based on the monitored current and/or voltage, the robot can be configured to consistently distribute the appropriate amount of liquid/water (e.g., approximately less than or equal to 0.1 liters per square meter). For example, in one embodiment, the pump can be configured to pump as much water as it can when the robotic cleaning device is moving in the cleaning direction (forward). The robot can slow down or speed up to keep the water per unit area approximately constant (e.g., within 10% of a target water per unit area). In some embodiments, in addition to or instead of slowing down or speeding up to match the pump configuration, the pump can be configured to increase or decrease the amount of liquid dispensed to match the speed of the robotic cleaning device.

In another embodiment, consistent distribution of a particular amount of liquid/water can be implemented in other ways. For example, the robotic cleaning device can include a flowmeter configured to directly measure the flow. Based on that measurement, the robot can speed up, slow down, increase the pump rate, decrease the pump rate, and/or modify its operation otherwise to achieve the particular amount of liquid/water per unit area.

In addition to dispensing a consistent and proper amount of cleaning liquid, the robot can detect if and when the water is out based on the current and/or voltage measurement(s). If the robot is out of water, it can light up or communicate to the support system that it is out of water. The system can flag that that particular row is not completely clean and/or the robotic cleaning device can clean the same row again.

As an alternative to the pump pumping as much water as it can when moving forward, the robotic cleaning device can be configured to operate in a particular cleaning mode, such as light, medium, or heavy soiling modes. Accordingly, the robotic cleaning device can be configured to select a particular cleaning mode based on its own determination of soiling level or it can be instructed to operate in a cleaning mode by the support system (e.g., the microcontroller). As noted above, the pump dispense rate, speed of travel, or both can be configured to achieve a particular amount of liquid per unit area and/or a particular cleaning mode.

As described herein, soiling levels can be determined visually by an operator, by the cleaning robot's sensors, by measuring particulates in rinse water, by measuring leftover water in the onboard reservoir, among other examples.

In one embodiment, the robot can be configured to determine an amount of remaining water, if any, that it has at the completion of cleaning a row of panels. Depending on how quickly the robot runs out of water or how much water remains at the completion of cleaning a row (e.g., by the robot emptying its remaining water and detecting that amount), the robot can communicate with the support system that it needs a particular amount more or less water. In one embodiment, the robot can communicate wirelessly via a transceiver to the support system.

In one embodiment, the support system can include a generator, battery charger(s), and a fill system.

In some embodiments, the fill system can include reservoir 1604 that can store the water/cleaning liquid from which the robot's onboard reservoir is filled. The fill system can also include microcontroller 1616 and pump 1606, which can receive instructions from microcontroller 1616 to pump water to water softener 1608 or D1 resin bottle. From there, the pumped cleaning liquid can be provided to accumulator 1610. Accumulator 1610 can store water at pressure (e.g., ~80 psi) in the system and can permit the use of a smaller pump 1606. In various embodiments, the pressure of the system at accumulator 1610 is approximately 60-80 psi. Microcontroller 1616 can also be coupled to solenoid valve 1612 to open or close the valve. When the hose is connected to the robotic cleaning device to fill the robot's onboard reservoir, the pressure at pressure sensor P2 can drop (e.g., to zero or near zero) and microcontroller 1616 can open solenoid valve 1612 and turn on pump 1606. When the robotic cleaning device's reservoir is nearly filled to the desired fill amount, solenoid valve 1612 can be closed and pump 1606 can be run until pressure in accumulator 1610 is built back up. In one embodiment, a regulator can be used to maintain 15 psi of pressure at the end of the hose when the solenoid valve 1612 is closed to allow for a dry disconnect. Moreover, the regulator can also re-pressurize the line to 15 psi so the microcontroller can detect the next connection of a robotic cleaning device.

The support system can also include a transceiver to communicate with computing device 122 and robotic cleaning device 1624. Various protocols can be used such as Bluetooth, Zigbee, or others. Computing device 122 can communicate with and provide data to a remote server, which can maintain cleaning schedules, maps of PV installation sites, among other data.

In one embodiment, the support system is a modularized system that can be added to a vehicle driven to a solar site.

Consider the following example operation of the robotic cleaning device and support system. In one embodiment, before the robot starts cleaning a particular row of PV modules, the support system can be configured to provide a metered fill of liquid to a the robotic cleaning device's onboard reservoir based on the soiling level of the PV modules. As discussed above, the soiling levels can be determined in a variety of manners. For example, soiling levels can be determined visually by an operator, by the cleaning robot's sensors, by measuring particulates in rinse water, by measuring leftover water in the onboard reservoir, among other examples.

In one embodiment, the support system can receive an indication from the robotic cleaning device, of an amount of water remaining in a reservoir onboard the robotic cleaning device. For example, the robotic cleaning device can measure the amount of liquid remaining and provide that measurement to the support system. In another example, the robotic cleaning device may not make such a measurement itself and can instead discard the remaining amount and the support system can measure the discarded amount. Based on the indication of water remaining, the support system can determine how much water to fill the robot's onboard reservoir with. For example, if a large amount of water remained, the support system can determine that less water than the previous fill should be provided to the robot. If no water remained, the support system can determine to provide a larger fill or same fill amount than the previous fill. The support system can then fill the robotic cleaning device's onboard reservoir with the determined fill amount. Note that because soiling amounts can vary, even within a single solar installation, the fill amount from cleaning pass to cleaning pass can vary. Thus, in a subsequent fill operation, the support system can determine that a different fill amount should be used for the subsequent refill.

As another simple examiner, an operator can simply decide that a particular row was not sufficiently cleaned and may configure the support system to provide a larger than normal fill amount.

In one embodiment, the robotic cleaning device can receive a command, from the support system (e.g., the computing device), to use more or less water per unit area (e.g., low, medium, heavy soiling modes, etc.). In other embodiments, the robotic cleaning device can be configured to use all of its onboard water in a single cleaning pass (e.g., along a row of PV panels) and the amount of water used is based on the amount of water in the onboard reservoir. Therefore, if the support system, operator, or robotic cleaning device indicates that more water is needed, then a larger fill amount will be used and a greater amount of water per square meter will be used.

In various embodiments, the robotic cleaning device can include a GPS receiver into its control board. The GPS can allow the robot to monitor its position. In one embodiment, the GPS locations can be stored in non-volatile memory in the control board. When the robots are within range of the support system's computing device, they can relay their logs (e.g., including an indication of which PV modules have, been cleaned) to the support system computing device. The GPS information can be analyzed to determine which modules at a site have been cleaned and when they have been cleaned.

Figure 17:
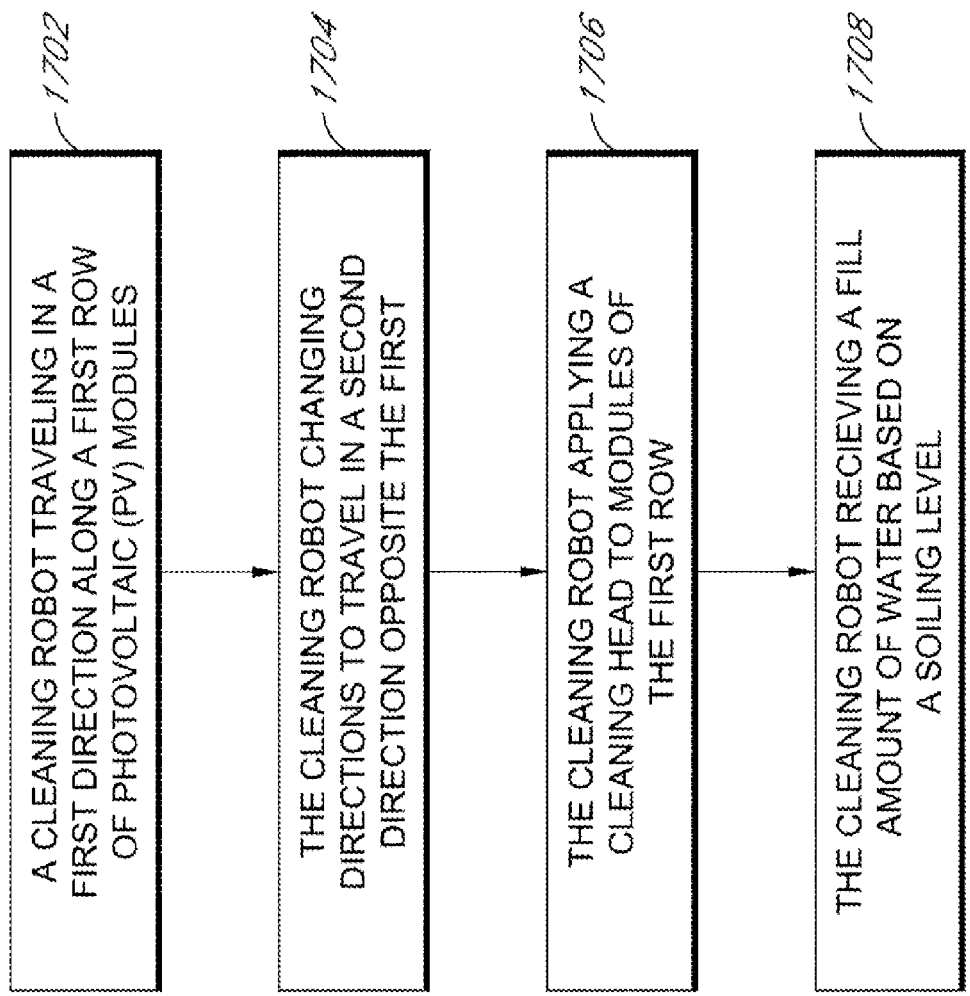
FIG. 17 is a flowchart of an example method for operating a robotic cleaning device.

Turning now to FIG. 17, a flow chart illustrating a method for operating a robotic cleaning device is shown, according to some embodiments. In various embodiments, the method of FIG. 17 may include additional (or fewer) blocks than illustrated.

As shown at 1702, a robotic cleaning device can travel in a first (e.g., reverse) direction along a row of PV modules. In some embodiments, a pre-soak can be applied when the robotic cleaning device travels in a reverse direction pass along the PV modules. Using the robotic cleaning device of FIG. 8 as an example, the reverse direction pass can be in a direction toward the squeegee(s) and away from the brush. The cleaning liquid can be sprayed or dripped on the surface of the module during the pre-soak. In some embodiments, as described herein, when the robot is moved in the reverse direction, the cleaning head can be in an up, disengaged configuration. And in one embodiment, the brush can be in contact with the PV module even when the cleaning head is in the up configuration. Thus, in one embodiment, the reverse direction can be a first cleaning pass using the cleaning liquid and brush agitation of the particulates. In other embodiments, the first cleaning pass can be a dry pass with or without brush agitation.

As illustrated at 1704, the robotic cleaning device can change travel directions to a second direction, different than the first. For example, if the first direction was a reverse direction, the second direction can be a forward direction.

As described above, in one embodiment, the robotic cleaning device can be equipped with multiple (e.g., four) downward facing sensors for detecting PV panels below the robot. In one embodiment, four sensors are located in the four corners with two in each drive module. The sensors can provide a logic level voltage to the control board indicative of whether a panel is directly below the sensor. The control board can detect the logic level and changes in the logic level. Changes in the logic level can represent the sensor (e.g., photoeye) passing from the panel to the gap between the panels.

Moreover, the sensors can also be used to determine when the robotic cleaning device should change directions. For example, in some embodiments, the robotic cleaning device moves backwards along the row of PV modules. Once the robotic cleaning device detects the end of the row (and not just a gap between PV modules), such as the end of the row of a tracker, the robotic cleaning device can change directions.

In some embodiments, onboard OPS measurements can be provided to the microcontroller and the microcontroller can instruct the robotic cleaning device to change direction, for example, in embodiments in which the microcontroller has access to OPS coordinates of the PV modules at the site. Or, in another embodiment, the robotic cleaning device can directly use its GPS coordinates in conjunction with the sensor data to determine the end of the row.

At 1706, the robotic cleaning device cart apply the cleaning head to modules of the row. Applying the cleaning head can cause the brush and squeegees to make contact with the PV module. The robotic cleaning device can apply the cleaning head as the robot moves forward along the row. The forward pass can be used as a rinse cycle for improved cleaning in embodiments in which the reverse direction did a brush agitation of particulates or it can serve to do the full cleaning in embodiments in which cleaning is not performed in the reverse direction. As described herein, in some embodiments, the cleaning head of the robotic cleaning device can have a forward curvature such that the cleaning head and the brush and/or squeegees can make substantially uniform pressure on the PV modules, even for sagged PV modules that are common in a PV installation.

As shown at 1708, the robotic cleaning device can receive a metered fill amount of water/cleaning liquid based on a soiling level of the plurality of PV modules. The soiling level can be observed by an operator, sensed by sensors on the robotic cleaning device, or be based on a remaining amount of water in the robotic cleaning device's onboard reservoir, among other examples. Note that because soiling varies according to PV installation site conditions, the amount used for a metered fill of the robotic cleaning device's onboard reservoir can vary by row, by robotic cleaning device, by location within the PV installation, current weather conditions, etc.

One advantage of the metered fill technique and structure is that it accommodates a wide variety of soiling conditions and row length without wasting a large amount of water. Instead, the system can use a low amount of water, yet clean the PV modules better than other systems.

Note that the methods described herein can be implemented by the various robotic cleaning devices described at FIGS. 2-16 or by other robotic cleaning devices. Accordingly, although the description of FIG. 17 was in the context of a robotic cleaning device with a brush and at least one squeegee, other robotic cleaning devices can operate according to the techniques and methods described herein.

Figure 18:
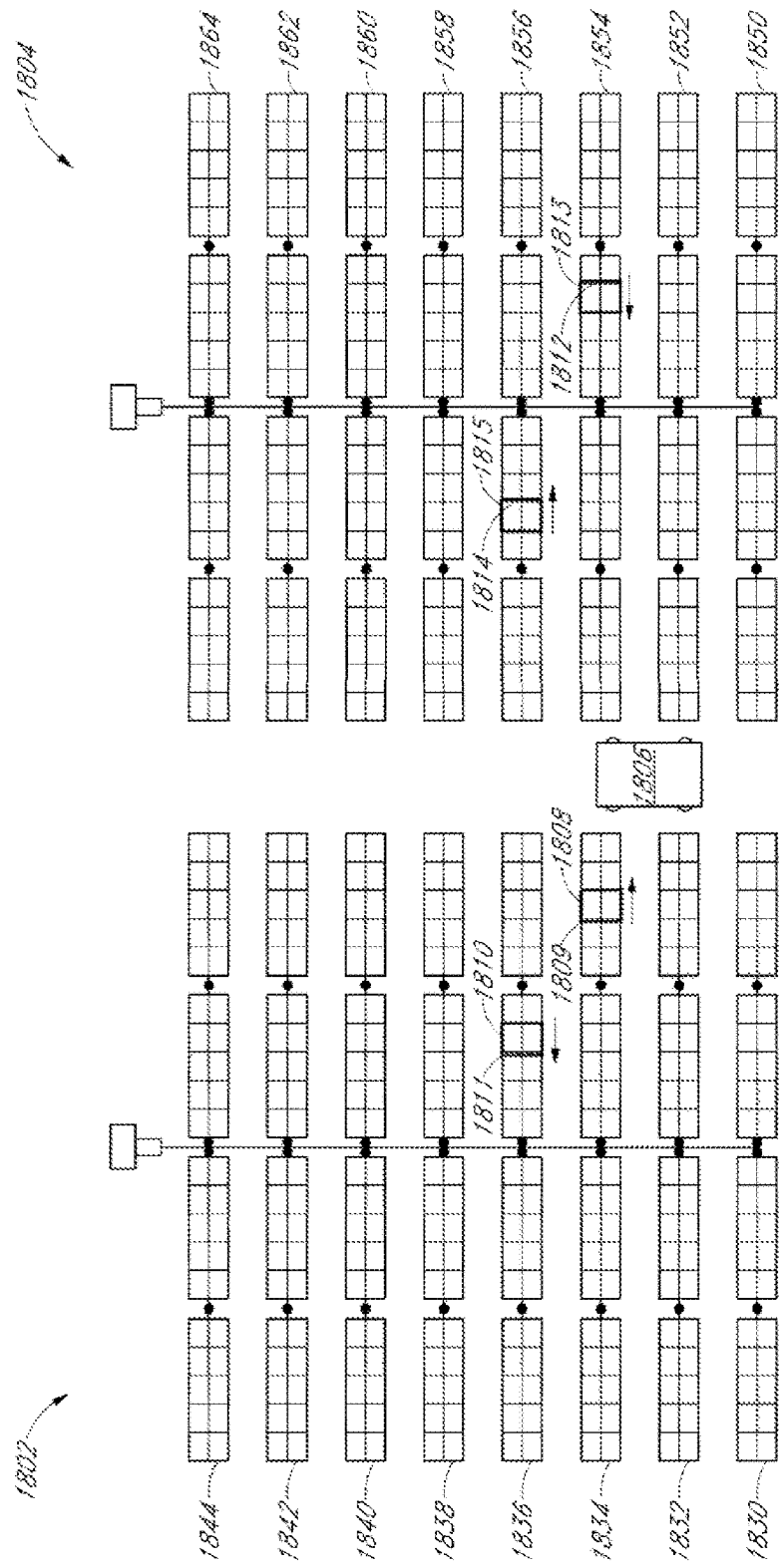
FIG. 18 is a plan view illustrating one example of cleaning a PV installation according to an out-and-back cleaning technique.

Turning now to FIG. 18, cleaning a PV installation according to an out-and-back cleaning technique is illustrated, according to one embodiment.

FIG. 18 illustrates a PV installation that includes two PV trackers 1802 and 1804, each similar to that of FIG. 1. For ease of illustration of the example of FIG. 18, much of the description of FIG. 1 is not repeated here but nevertheless applies.

As shown in the example of FIG. 18, PV tracker 1802 includes eight rows, rows 1830, 1832, 1834, 1836, 1838, 1840, 1842, and 1844. Likewise PV tracker 1804 also includes eight rows, rows 1850, 1852, 1854, 1856, 1858, 1860, 1862, and 1864. Support system 1806 is shown between PV trackers 1802 and 1804 positioned near the rows that are being cleaned by robotic cleaning devices 1808, 1810,1812, and 1814.

Robotic cleaning device 1808 with cleaning head 1809 actuated (actuation not illustrated) is illustrated moving in the "back" direction from left to right (as indicated by the arrow) along row 1834 toward support system 1806. According to an out-and-back cleaning technique, robotic cleaning device first traveled along row 1834 from right to left with the cleaning head in its up position (the "out" of the out-and-back). Upon reaching the left end of row 1834, robotic cleaning device 1808 changed directions to the direction illustrated and applied its cleaning head while traveling back toward the support system. Upon completion of row 1834, robotic cleaning device 1808 can be serviced (e.g., battery replaced, liquid filled, etc.) and then placed on another row of PV tracker 1804 that has not yet been cleaned, such as row 1838.

Similarly, robotic cleaning device 1810 is illustrated by the arrow as traveling in the "out" direction in row 1836 away from the support system. As described herein, when traveling out, or backwards, the robotic cleaning device can have its cleaning head disengaged until changing directions for the "back" cleaning pass along row 1836. As was the case with robotic cleaning device 1808, upon completion of its row, robotic cleaning device 1810 can be serviced by support system 1806 and then placed on the next open row, such as row 1840 (assuming robotic cleaning device 1808 is on tow 1838 at the time robotic cleaning device 1810 is ready to clean a new row).

The example of FIG. 18 also illustrates two robotic cleaning devices 1812 and 1814 on rows 1854 and 1856 of PV tracker 1804, respectively. The out-and-back technique illustrated by robotic cleaning devices 1808 and 1812 on PV tracker 1802 applies equally with the exception that robotic cleaning devices 1812 and 1814 first travel backwards ("out") left to right with the cleaning head disengaged, followed by returning ("back") to support system 1806 right to left with the cleaning head engaged. Accordingly, the robotic cleaning devices on PV tracker 1804 are oriented 180 degrees from those on PV tracker 1802 to facilitate the different starting side of the respective tracker and different forward cleaning direction (toward the support system in both cases).

Although the example of FIG. 18 illustrates four robotic cleaning devices and a single support system, in other instances, additional robotic cleaning devices and/or support systems can be used. For example, in another implementation, six robotic cleaning devices can be used per support system. For longer rows, additional robots can be used per support system because the robots would spend more time actively traversing a row. Or, if the robots are faster, fewer robots could be used because they will spend less time actively traversing a row.

Moreover, other techniques also apply in addition to the out-and-back technique described FIGS. 17-18. For example, in one embodiment, the robotic cleaning device can operate according to a leapfrog technique in which the robotic cleaning device makes a single pass (e.g., while cleaning in the forward direction) along the row of a tracker, the robotic cleaning device is then optionally serviced (e.g., liquid refilled, battery changed, etc.) and then placed on a row of an adjacent tracker. Using the tracker arrangement of FIG. 18 to further illustrate the leapfrog technique, the robotic cleaning device could be placed on row 1830, clean from left to right in a single pass, then be placed on row 1850 of the adjacent tracker and then clean from left to right in a single pass. If more trackers are present, the robotic cleaning device could proceed along corresponding rows of those other trackers.

Another technique is a snake technique in which the robotic cleaning devices snake from one row of a tracker to the next. For instance, a robotic cleaning device could be placed on the left hand side of row 1830 and clean in a single pass while traversing row 1830 from left to right, the robot can then be placed on the right hand side of row 1832 (and optionally serviced) and clean row 1832 in a single pass while traversing row 1832 from right to left. Accordingly, in the snake technique, the robotic cleaning device can be configured to clean in either the right to left or left to right direction in a single pass depending on the particular row.

One advantage of the out-and-back technique over the leapfrog and snake techniques is that it can enhance cleaning efficiency and reduce cost by utilizing fewer support systems (with less labor cost due to fewer operators).

Figure 19:
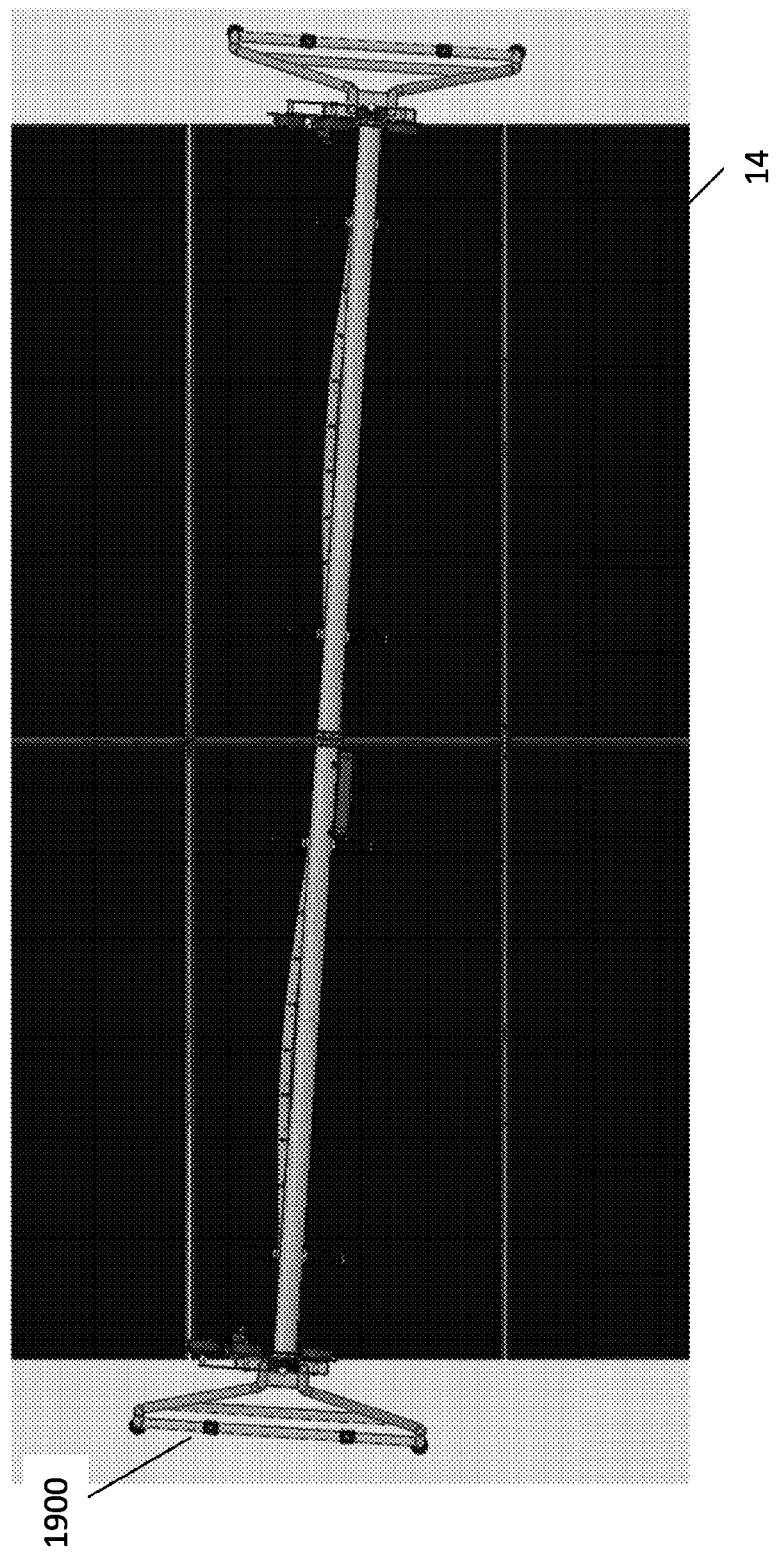
FIG. 19 is an example illustration of a device for cleaning solar collectors that is misaligned with the edges of the solar collector being cleaned.
Figure 20:
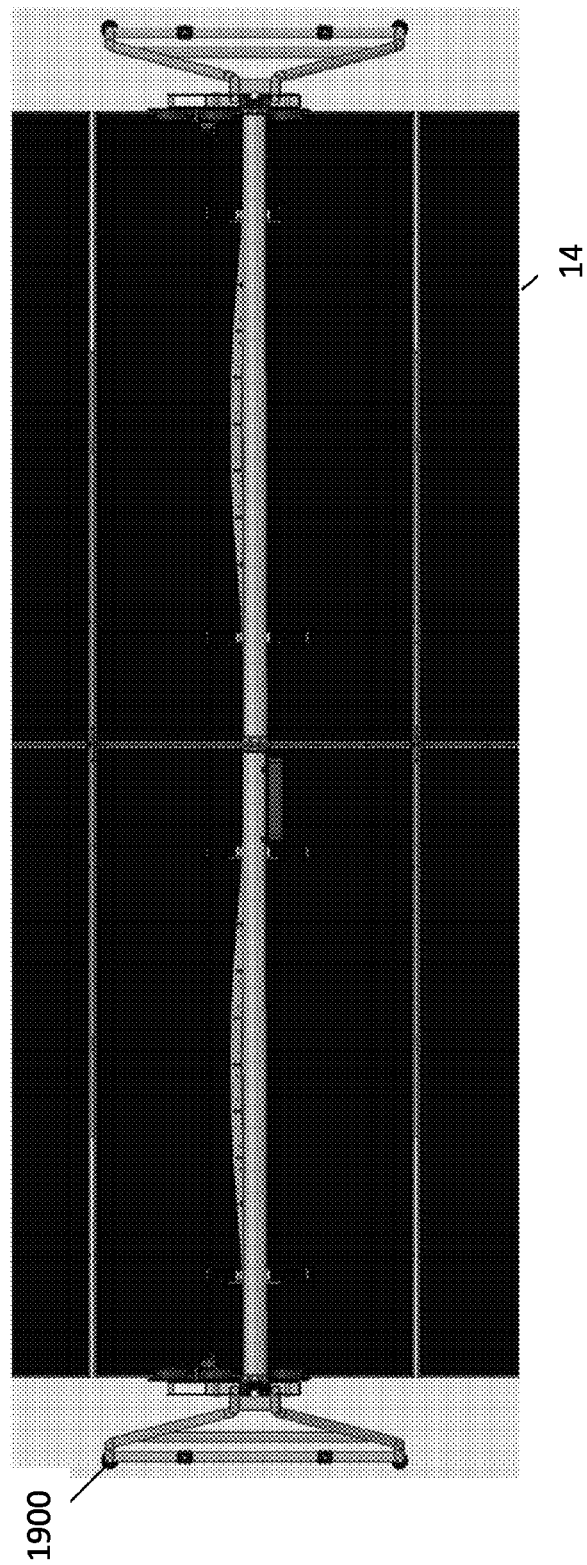
FIG. 20 is an illustration of an example device for cleaning solar collectors that is properly aligned with the edges of the solar collector being cleaned.

FIG. 19 illustrates one of the challenges to cleaning solar collectors with an automated cleaning device. In FIGS. 19 and 20, an automated cleaning device 1900 moves across the face of a solar collector 14. As it does, the automated cleaning device 1900 may spray a cleaning liquid using on-board nozzles, scrub the face of the solar collector 14 with on-board brushes, and then remove the cleaning liquid and any debris suspended therein with an on-board squeegee that, for example, spans an entire length of the solar collector 14. However, as illustrated in FIG. 19, the automated cleaning device may become misaligned relative to the edges of the solar collector 14. This can occur, for example, if the drive on one side of the automated cleaning device 1900 moves at a faster (or slower) speed than the drive on the other side of the automated cleaning device 1900. This misalignment may make the cleaning of the solar collector less efficient and/or less effective, and may even cause the automated cleaning device 1900 to "bind" and become unable to continue moving across the face of the solar collector 14. Therefore, the automated cleaning device 1900 should remain in alignment with respect to the edges of the solar collector 14, as illustrated in FIG. 20, to clean the surface of the solar collector 14 efficiently and effectively.

Figure 21:
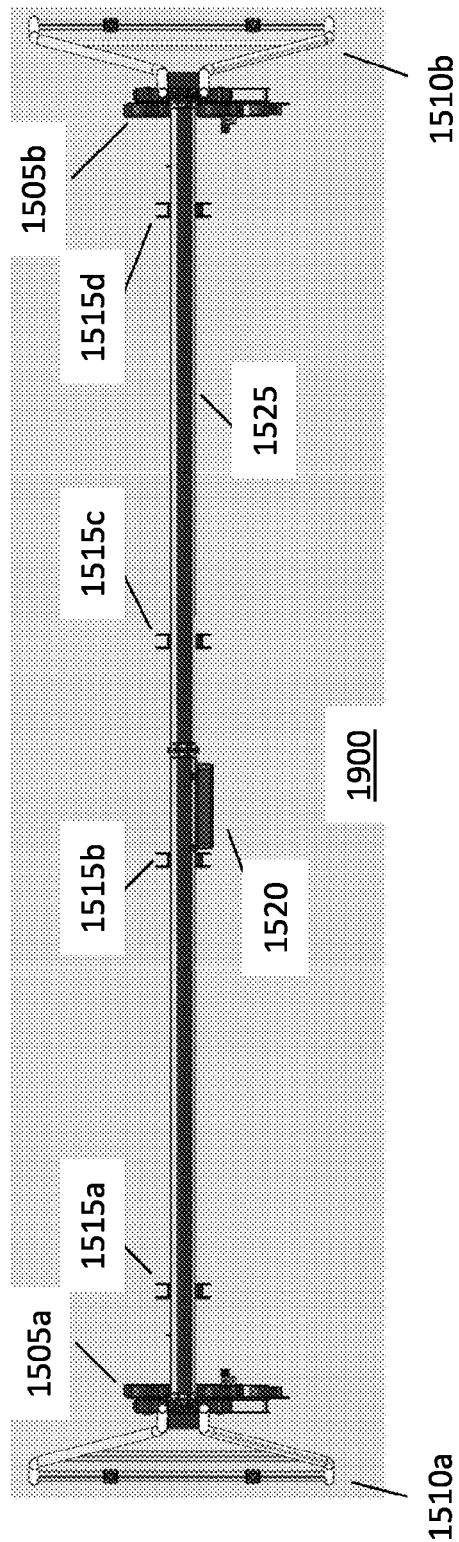
FIG. 21 is an illustration of another example device for cleaning solar collectors.

FIG. 21 is an illustration of an automated cleaning device 1900 according to exemplary aspects of the present disclosure. The device 1900 includes a main shaft 1525 with several mounting points 1515*a*, 1515*b*, 1515*c*, 1515*d* (collectively referred to as 1515) for mounting components such as those described below. The main shaft 1525 also includes a control unit 1520 in which control circuitry such as the one described below is housed. The main shaft 1525 may be elongated along and/or define a longitudinal axis of the cleaning device 1900.

As illustrated in FIG. 21, there are drive units 1505*a* and 1505*b* (collectively referred to as 1505) attached to either end of the main shaft 1525. The drive units 1505 propel the device 1900 along the surface of a solar collector (not shown) to clean the surface. A detailed description of the drive units 1505 is provided below.

Optionally, attached to either end of the main shaft 1525 are handles 1510 a and 1510*b* used to initially position the automated cleaning device 1900 on a solar collector 14 and to remove the automated cleaning device 1900 from the solar collector 14 when the cleaning operation is finished. The handles 1510*a* and 1510*b* can also serve as stands to support the automated cleaning device 1900 when not in use. The handles 1510 a and 1510*b* may be three feet (ft) to four ft in length to facilitate placement of the automated cleaning device 1900 on the surface of a solar collector without, for example, use of a ladder. Of course, the handles 1510*a* and 1510*b* may be of any other length without departing from the scope of the present disclosure.

As can be appreciated, the device 1900 illustrated in FIG. 19 is merely one example, and other device structures are possible without departing from the scope of the present disclosure. For example, the device 1900 may have more than one shaft 1525 to increase the width of the device 1900 and its capability to carry additional cleaning modules (not shown). The main shaft 1525 may also be made telescopic to accommodate solar collectors of varying widths. For example, the shaft 1525 may be formed from at least two parts, with at least one of these parts being a tube and at least one other part having a smaller outer circumference or outer diameter to enable this other part to move in and out of the larger tube to increase or decrease the length of the shaft 1525. The telescopic main shaft 1520 may be adjusted manually or automatically by the device 1900 by sensing the edges of the solar collector 14, as described in detail below. Other variations are also possible as would be recognized by those skilled in the art.

Figure 22:
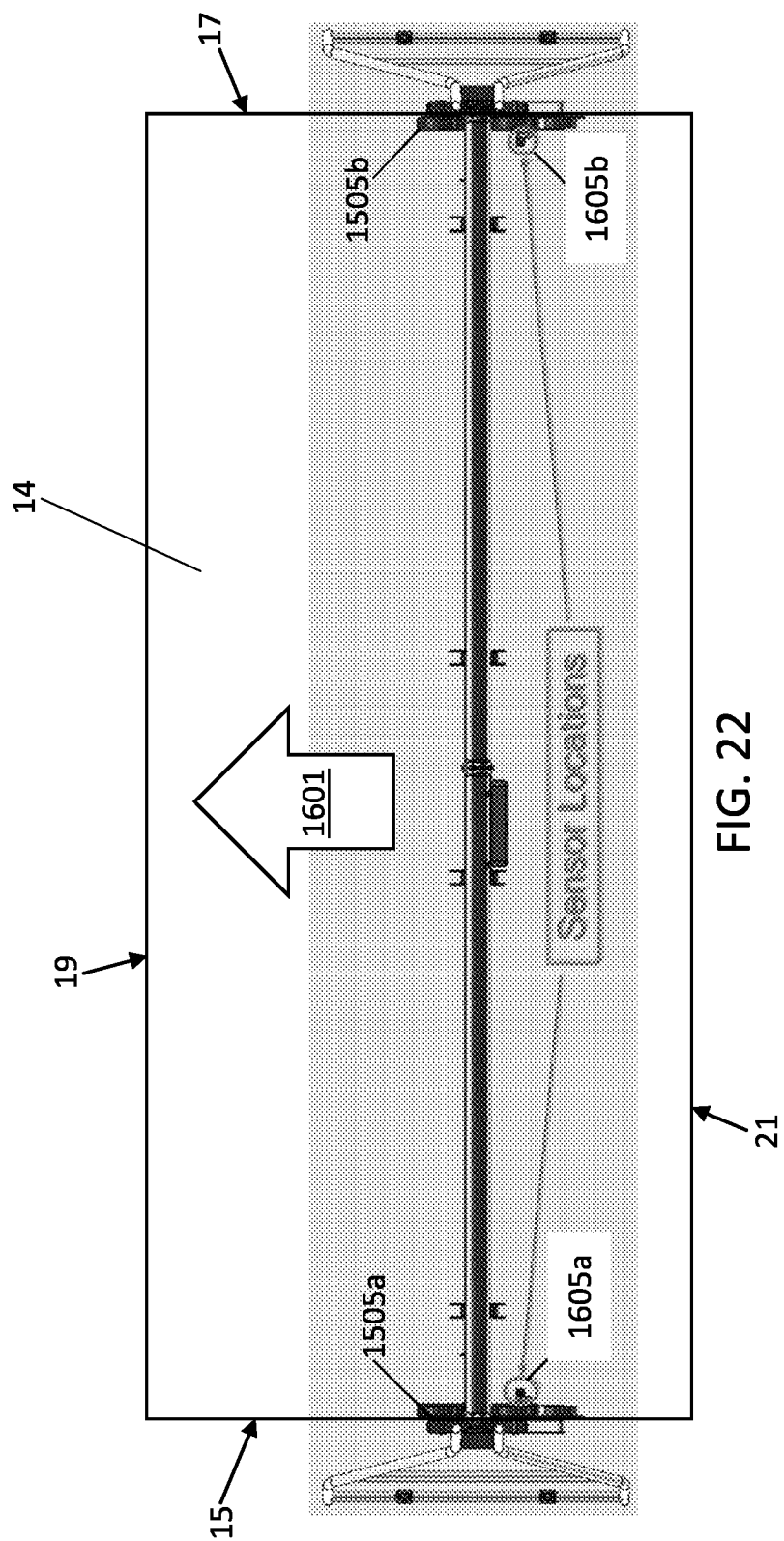
FIG. 22 is another illustration of the device for cleaning solar collectors shown in FIG. 21.

FIG. 22 is another illustration of the cleaning device 1900. In FIG. 22, the device 1900 includes the same components as described above. However, sensors 1605 a and 1605*b* (collectively referred to as 1605) are illustrated as being attached to the drive units 1505. The sensors 1605 detect the edges of the solar collector on which the device is placed. Upon detection, the sensors 1605 generate signals that are provided to the control unit 1520, which uses the signals to maintain alignment of the device 1900 as it travels along the face of the solar collector.

For example, the cleaning device 1900 may be moving in a first direction 1601 (e.g., upward or toward the top of FIG. 22) relative to the solar collector 14. The drive units 1505 on opposite edges, ends, or sides of the cleaning device 1900 may be located at or near opposite edges, ends, or sides 15, 17 of the solar collector 14. The direction 1601 in which the cleaning device 1900 is moving may be between and/or parallel to other opposite edges, ends, or sides 19, 21 of the solar collector 14. For example, the solar collector 14 may be bounded or framed by the opposite edges 15, 17 and by the opposite edges 19, 21, with each of the edges 15, 17 extending from one edge 19 to the opposite edge 21 and each of the edges 19, 21 extending from one edge 15 to the opposite edge 17.

During movement of the cleaning device 1900, one end of the cleaning device 1900 may move farther and/or faster than the other end of the cleaning device 1900. For example, one drive unit 1505a (or 1505b) may advance farther along the solar collector 14 than the other drive unit 1505b (or 1505a). This can cause the cleaning device 1900 (e.g., specifically, the main shaft 1525) to be tilted relative to the edges 19, 21 of the solar collector 14. Such a tilted orientation of the cleaning device 1900 can resemble or be identical to the position of the cleaning device 1900 shown in FIG. 19. For example, in the tilted state or orientation of the cleaning device 1900, the main shaft 1525 or longitudinal axis of the cleaning device 1900 may be oriented at a non-orthogonal angle (e.g., an angle other than ninety degrees) to the edges 15, 17 of the solar collector 14 and/or may be oriented at a non-parallel angle to the edges 19, 21 of the solar collector 14. If the cleaning device 1900 continues to move in this tilted orientation toward the edge 19, the left side or leading end sensor 1605a may cross over or sense the edge 19 before the right side or trailing end sensor 1605b crosses over or senses the same edge 19.

In a situation where the left side drive unit 1505a is moving ahead of the right side drive unit 1505b relative to the edge 19 of the solar collector 14, the control unit 1520 may eventually receive a first signal from the left side sensor 1605a indicating that this sensor 1605a has detected the edge 19 of the solar collector 14 (e.g., when the drive unit 1505a reaches or passes the edge 19). Responsive to receiving this signal, the control unit 1520 may start a timer. The control unit 1520 may receive a second signal from the other sensor (e.g., the right side sensor 1605b) indicating that this sensor 1605b has detected the edge 19 of the solar collector 14. Due to the tilted orientation of the cleaning device 1900 (e.g., as shown in FIG. 13), the first signal may be received by the control unit 1520 prior to the second signal.

Responsive to receiving the second signal, the control unit 1520 may stop and/or examine the timer that was started responsive to the first signal being received. Since the sensors 1605 are attached to the drive units 1505, the value or time of the timer examined responsive to receiving the second signal may indicate the amount of misalignment between the two drive units 1505. For example, longer values of the timer (e.g., longer delays between receiving the first and second signals) may indicate that the drive unit 1505 moving the sensor 1605 that provided the first of these signals is farther ahead of the other drive unit 1505 moving the other sensor that provided the later of these signals (e.g., farther toward the edge 19 of the solar collector 14). Conversely, shorter values of the timer (e.g., shorter delays between receiving the first and second signals) may indicate that the drive unit 1505 moving the sensor 1605 that provided the first of these signals is not as far ahead of the other drive unit 1505 moving the other sensor that provided the later of these signals. In the example orientation shown in FIG. 13, the timer value may indicate that the drive unit 1505b lags behind the drive unit 1505a due to the left side of the cleaning device 1900 being ahead of the right side.

The control unit 1520 may then generate control signals to the drive units 1505 based on the value of the timer, or the delay. For example, the control unit 1520 may send a signal to drive unit 1505a to slow down or stop movement to allow drive unit 1505b to catch up. Additionally or alternatively, the control unit 1520 may send a signal to drive unit 1505b to speed up to catch up to drive unit 1505a. Of course, any other method of motor control may be used in order to ensure that the drive units 1505, and therefore the device 1900, remain aligned as the cleaning device 1900 progresses along the face of the solar collector. In one example, the adjustment of the alignment may occur responsive to the cleaning device 1900 passing over, between, or across the edge 19 of one solar collector 14 to across the edge 21 of another solar collector 14.

Optionally, the cleaning device 1900 may use output from the sensors 1605 to detect one or more of the lateral edges 15, 17 of the solar collector 14. For example, during manual or automatic extension or contraction of the main shaft 1525 that can telescope to longer or shorter lengths, the control unit 1520 may receive signals from one or more of the sensors 1605 when the sensors 1605 detect one or more of the edges 15, 17. Responsive to the sensors 1605 sending signals that the edges 15, 17 are detected, the control unit 1520 can stop extending or contracting the telescoping main shaft 1525 or may provide audible or visual output (e.g., an audible and/or visual alarm) to notify an operator to stop extending or contracting the length of the telescoping main shaft 1525. The control unit 1520 may automatically extend or contract the telescoping main shaft 1525 using one or more motors disposed within the main shaft 1525.

The sensors may be inductive sensors that detect changes in electromagnetic fields caused by metallic objects, such as the frame of a solar collector. The sensors may also be optical sensors, infrared sensors, laser sensors, mechanical sensors that "feel" for the edge of the solar collector, or any other sensors that is known. Therefore, the specific sensor used in the device 1900 to detect the edge of a solar collector is not limiting upon the present disclosure.

Although the sensors 1605 are shown as being mounted on the drive units 1505, the sensors 1605 may also be located elsewhere. For example, the sensors 1605 may be located at the center of the device 1900, such as where the control unit 1520 is located. From this location, sensors such as laser sensors, may detect the edges of the solar collector. Moreover, a combination of sensors may also be used, such as indicative sensors attached to the drive units 1505 and one or more laser sensors located at the center of the device 1900. Such an arrangement may allow for a more reliable detection of the edges of the solar collector 14. Thus, the specific location of the sensors and combination of sensors used is not limiting on all embodiments of the present disclosure.

In addition, the sensors 1605 may continuously or repeatedly provide signals to the control unit 1520 indicating the position of the device 1900 relative to the edges 15, 17, 19, 21 of the solar collector 14, may provide the signals at predetermined times, or periodically. The control unit 1520 may receive the signals by polling the sensors 1605, or may receive the signals via interrupts generated when new signals from the sensors 1605 become available. Any other method of providing the signals to the control unit 1520 may also be used without departing from the present disclosure.

Figure 23:
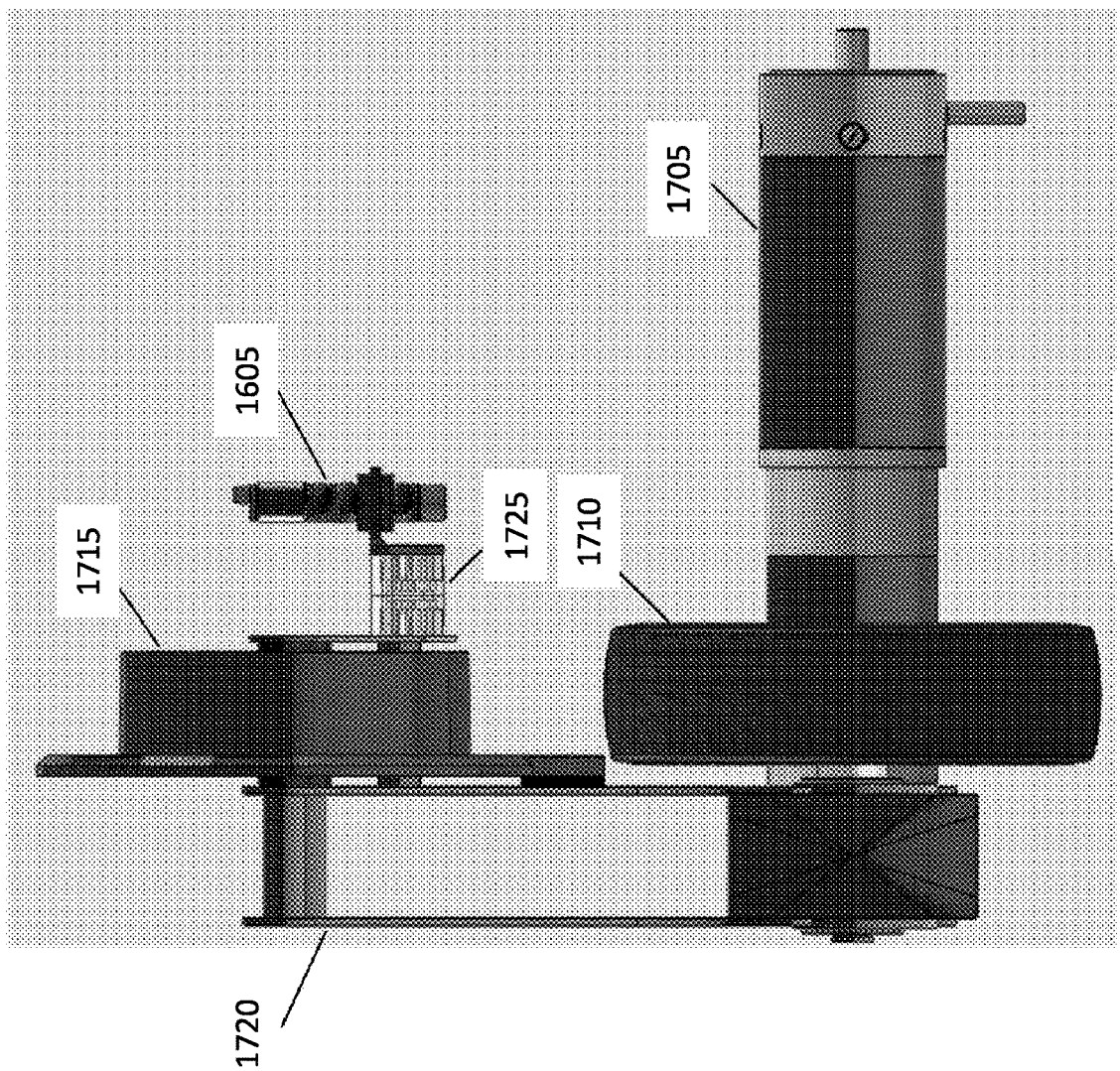
FIG. 23 is an illustration of an example drive mechanism for the device shown in FIG. 21.

FIG. 23 is a front illustration of the drive unit 1505 that is attached to each end of the main shaft 1525 of the device 1900. As can be appreciated the drive unit 1505*a* and 1505*b* mirror, but are otherwise the same in construction. Therefore, description of only one drive unit 1505 is provided for the sake of brevity.

The drive unit 1505 includes a frame 1720 to which drive wheels 1710 are attached. The drive wheels 1710 are driven by an electric motor 1705 under control of the control unit 1520. As can be appreciated, the electric motor 1705 may directly drive the drive wheels 1710, or may drive the drive wheels 1710 via a belt, chain, and/or a series of gears. The drive wheels 1710 ride along the bottom surface of the solar collector to propel the device 1900, and may be made of solid rubber or may be inflatable. Regardless of the material from which the drive wheels 1710 are made, the drive wheels 1710 are designed to be compressible to grip the solar collector and resist slipping in wet conditions. The material of the drive wheels 1710 can also be non-marking.

Upper wheels 1715 are attached to the frame 1720 above the drive wheels 1710 so that a gap exists between the two wheels to receive the solar collector. This allows the drive units 1505 to grip the solar collector as the drive units 1505 propel the device 1900 during cleaning, thereby compensating for the normal force created by the pressure exerted by the head mount on, for example a squeegee, as is explained in detail below.

The upper wheels 1715 in FIG. 23 may not be driven by the electric motor 1705. Instead, these upper wheels 1715 may merely contact the upper surface (e.g., the light collecting surface) of the solar collector 14 and rotate due to movement of the drive unit 1505 relative to the upper surface of the solar collector 14. These upper wheels 1715 can be spaced apart from the lower wheels to slightly compress or otherwise ensure contact between the upper and lower wheels and the opposite surfaces of the solar collector 14. The upper wheels 1715 may not be rotated by a motor to prevent scuffing, scratching, or other damage to the surfaces of the solar collector 14. For example, separately rotating the upper wheels 1715 from the lower wheels 1710 can result in the upper wheels 1715 rotating more slowly than the lower wheels 1710 (e.g., due to deterioration of bearing, bearing lubricant, or the like). The different rotational speeds of the wheels 1710, 1715 may cause the upper wheels 1715 to slide along the upper surface of the collector 14 instead of rolling along the upper surface of the collector 14. This can result in the upper wheels 1715 scratching, scuffing, or otherwise damaging or dirtying the upper surface of the collector 14.

Alternatively, the upper wheels 1715 can be driven by the electric motor 1705 (or another electric motor that is not shown) directly, via a belt, chain, and/or a system of gears without departing from the scope of the present advancements. The upper wheels 1715 may also be made of plastic, solid rubber, or may be inflatable. The upper wheels 1715 also have flanges to help guide the device 1900 as it moves along the surface of a solar collector.

The sensor 1605 is attached to, and spaced apart from, the upper wheels 1715 via an attachment mechanism 1725. This way the sensor 1605 rides just above the surface of the solar collector to be able to detect the edge thereof. As can be appreciated, the attachment mechanism 1725 may be adjustable in multiple directions in order to allow calibration and proper positioning of the sensor 1605. Moreover, the adjustment of the attachment mechanism may be manual, or may be automatically made by the control unit 1520 in a calibration process executed prior to the start of cleaning of a solar collector.

Figure 24:
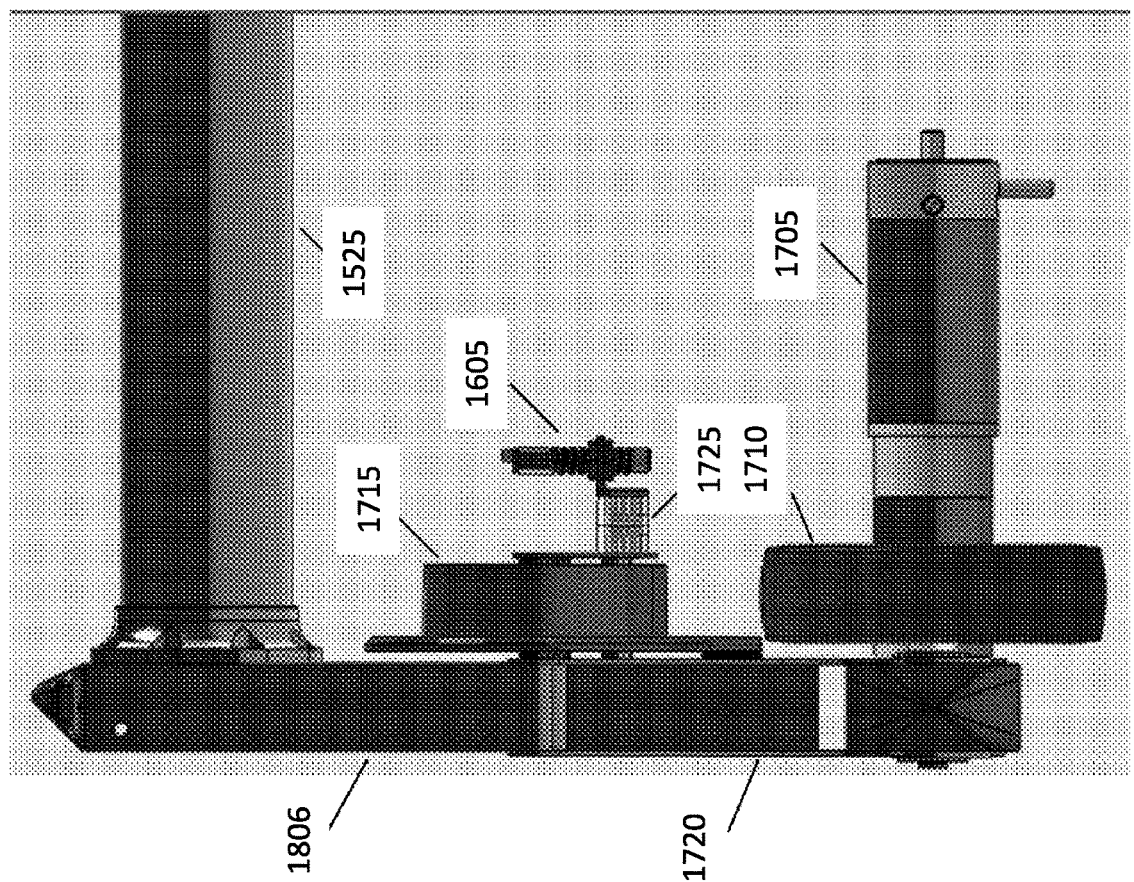
FIG. 24 is another illustration of the drive mechanism shown in FIG. 23.

FIG. 24 is another view of the drive unit 1505 according to exemplary aspects of the disclosure. As illustrated in FIG. 24, the main shaft 1525 is attached to the frame 1720 of the drive unit 1505 by a mounting bracket 1805. The mounting bracket may be adjustable to allow the height of the main shaft 1525 relative to the upper surface of the solar collector to be varied to accommodate various types of cleaning components.

Figure 25:
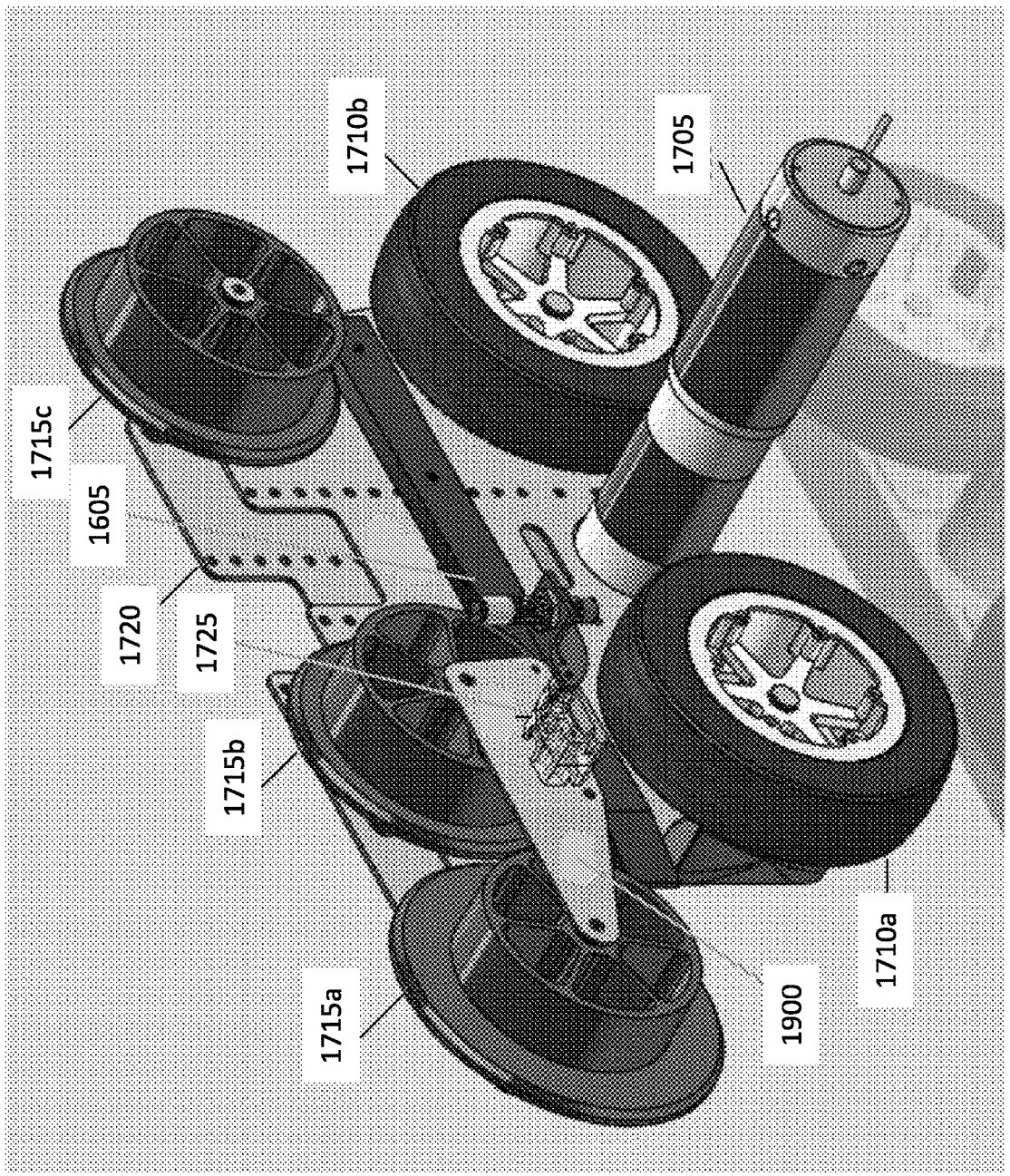
FIG. 25 is an illustration of the drive mechanism shown in FIG. 23.

FIG. 25 is a further illustration of the drive unit 1505. As can be seen from FIG. 25, the drive unit 1505 includes three upper wheels 1715*a*, 1715*b*, 1715*c*, and two drive wheels 1710*a*, 1710*b*. The electric motor 1705 is mounted to the frame 1720 between the two drive wheels 1710*a*, 1710*b*. One or both of the drive wheels 1710*a*, 1710*b* may be driven by the electric motor 1705.

The attachment mechanism 1725 includes a plate 1900 that attaches to the axels of the upper wheels 1715*a* and 1715*b* in order to firmly hold the sensor 1605 in place as the device moves 1300. The attachment mechanism 1725 is reinforced in order to resist flexing or moving as the device 1900 travels along a solar collector to minimize or reduce detection errors.

Figure 26:
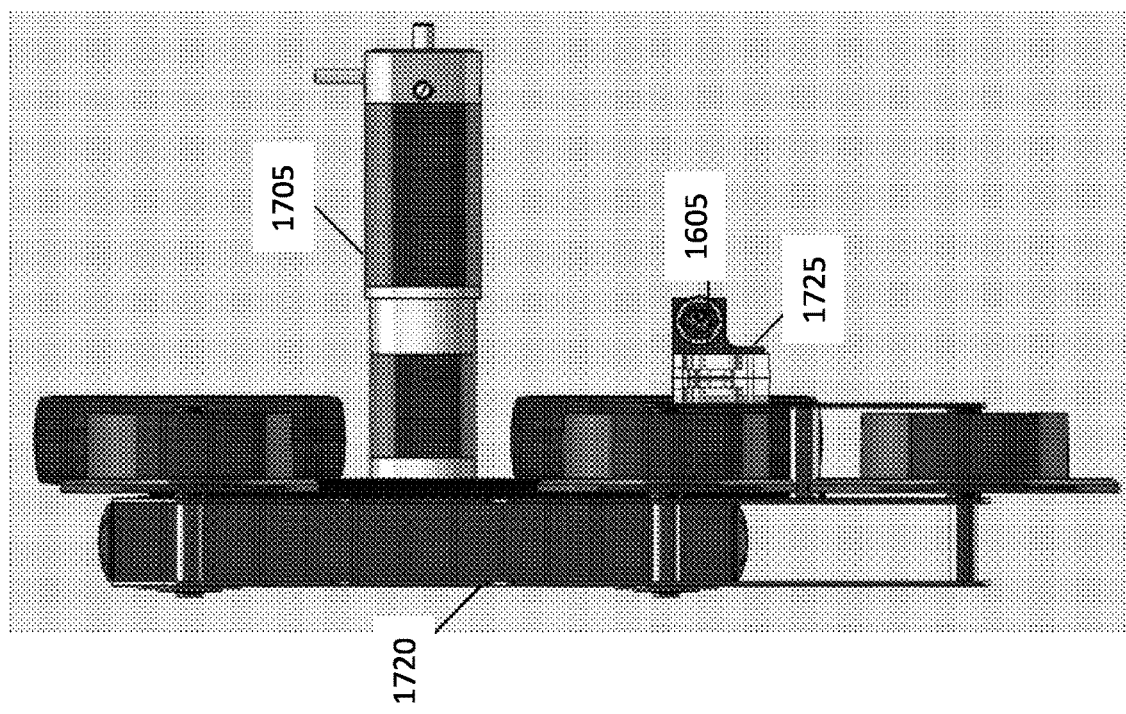
FIG. 26 is an illustration of the top of the drive mechanism shown in FIG. 23.
Figure 27:
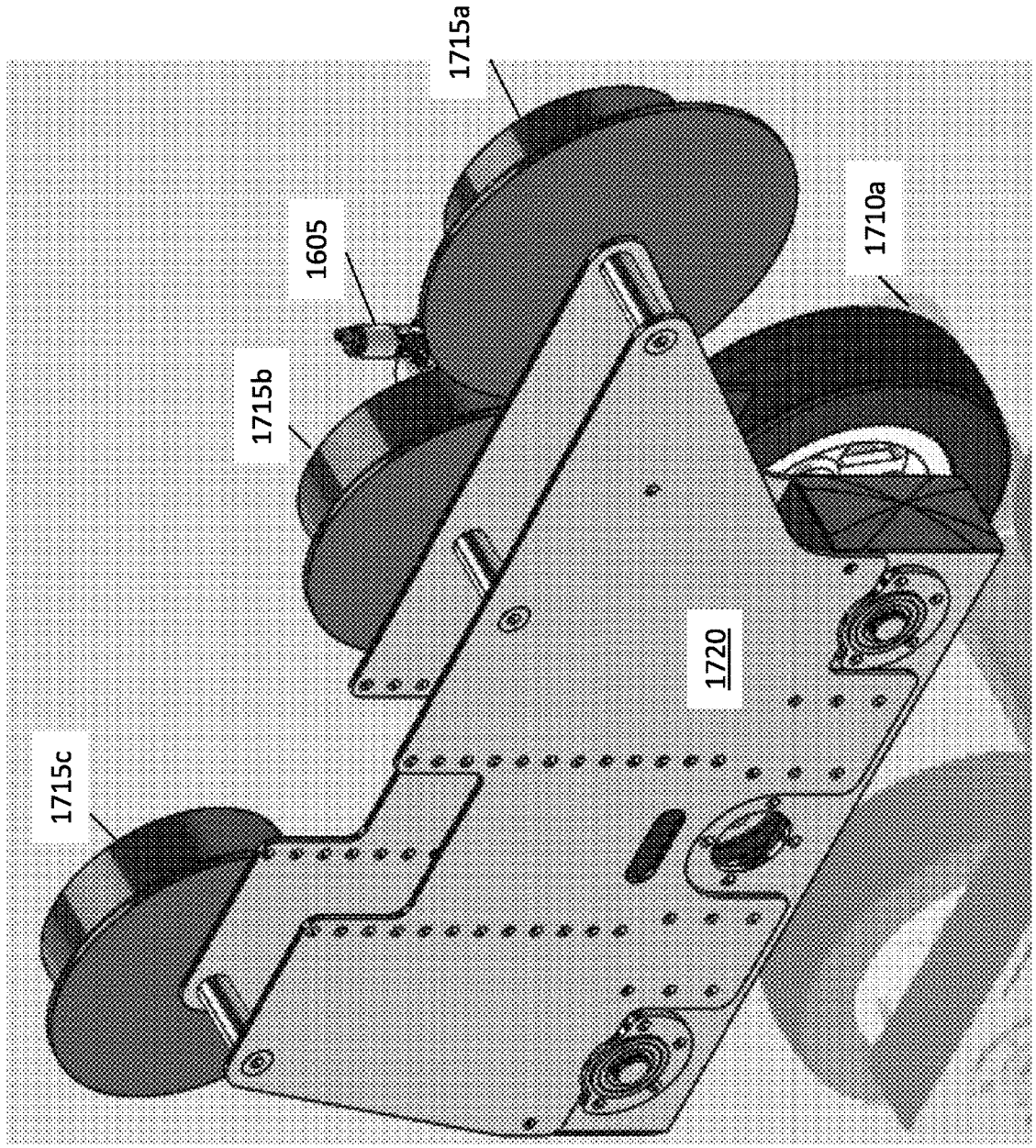
FIG. 27 is an isometric illustration of the drive mechanism shown in FIG. 23.

FIG. 26 is a top illustration of the drive unit 1505, and FIG. 27 is an isometric illustration of the drive unit 1505. As the components of the drive unit 1505 were described above, further description of these components is omitted for brevity. However, it should be noted that the frame 1720 of the drive unit 1505 may be made of metal, aluminum, carbon fiber, Kevlar, reinforced plastic, or any other material that provides sufficient strength and stiffness while remaining lightweight. Thus, the material from which the frame 1720 of the drive unit 1505 is made is not limiting upon the present disclosure.

Figure 28:
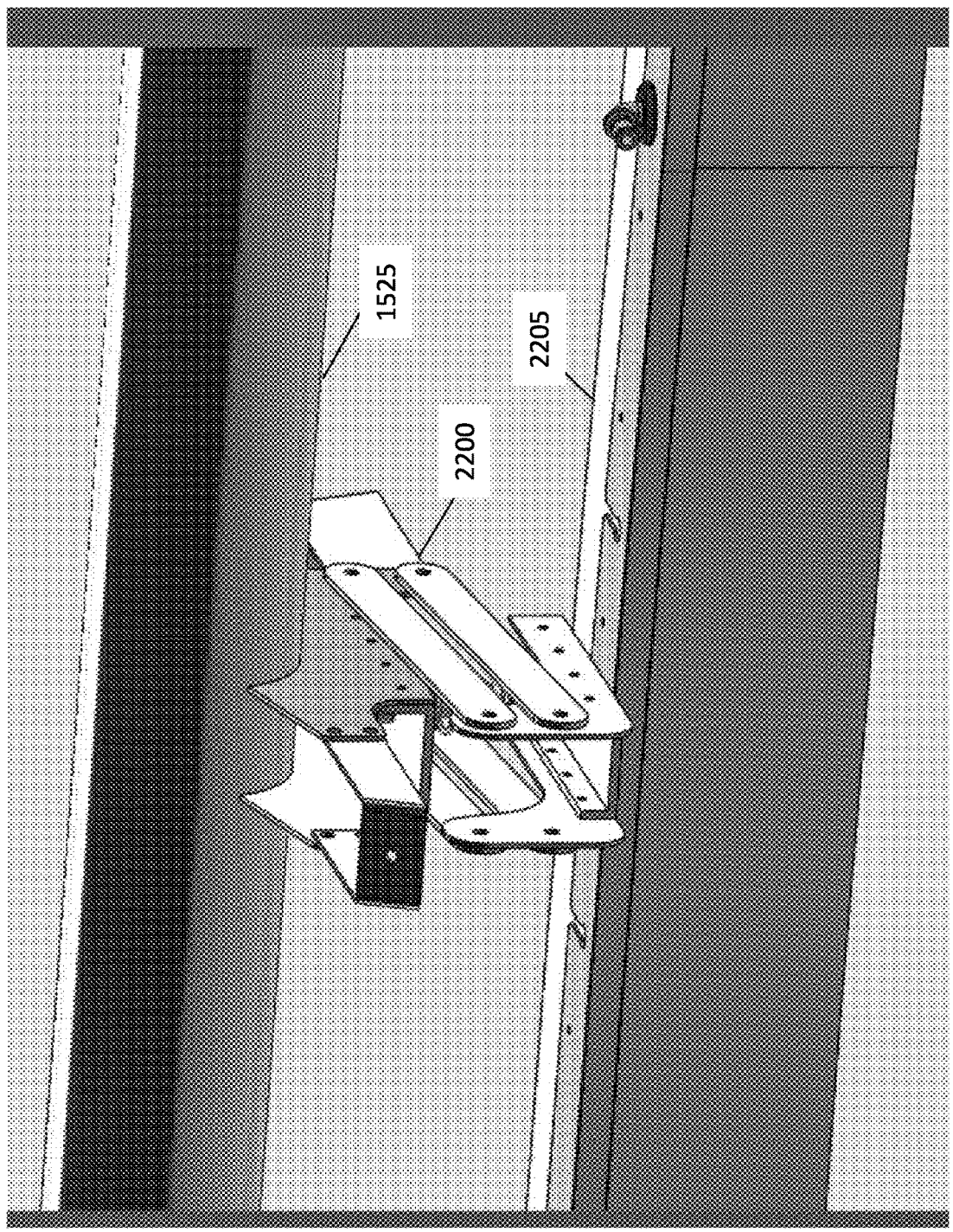
FIG. 28 is an illustration of an example head mount for the device shown in FIG. 21.

Next, the head mount 2200 is described with reference to FIG. 28. The head mount 2200 attaches cleaning components to the main shaft 1525 of the device 1900. For example, in FIG. 28, the head mount 2200 attaches a squeegee 2205 to the main shaft 1525 of the device 1900. However, other cleaning components such as brushes, nozzle assemblies and vacuum assemblies can also be attached to the main shaft 1525 by the head mount 2200 without departing from the scope of the present disclosure. For example, a cleaning component may include an on-board reservoir that stores cleaning solution that is applied to the surface of a solar collector by the device 1900 via an on-board nozzle assembly. Alternatively, a reservoir to store a cleaning solution may be located off-board. In this case, a nozzle connected to the off-board reservoir by a hose may be attached to the device 1900 to deliver the cleaning solution to the surface of a solar collector. Thus the specific cleaning components, or modules, attached to the device 1900 are in no way limiting upon all embodiments of the present disclosure.

Figure 29:
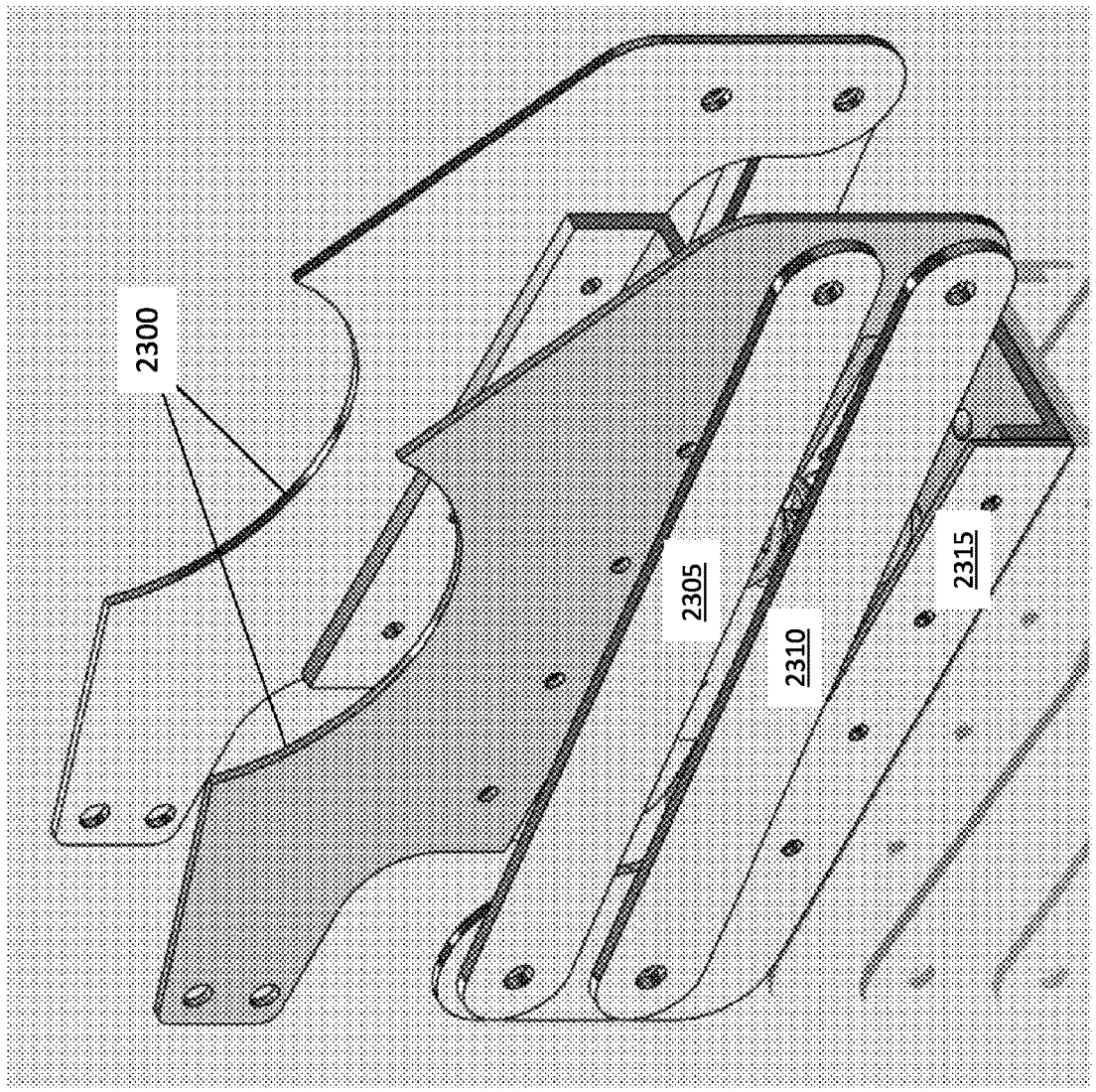
FIG. 29 is an isometric illustration of the head mount shown in FIG. 28.

FIG. 29 is an isometric illustration of the head mount 2200 according to exemplary aspects of the present disclosure. The head mount 2200 includes plates 2300 that have a curved edge to receive the main shaft 1525. The plates 2300 are respectively attached to ends of two metal members 2305 and 2310 which allow the plates 2300 to rise and lower. The other ends of the metal members 2305 and 2310 are attached to a base member 2315 which attaches to the cleaning component, such as the squeegee 2205.

Figure 30:
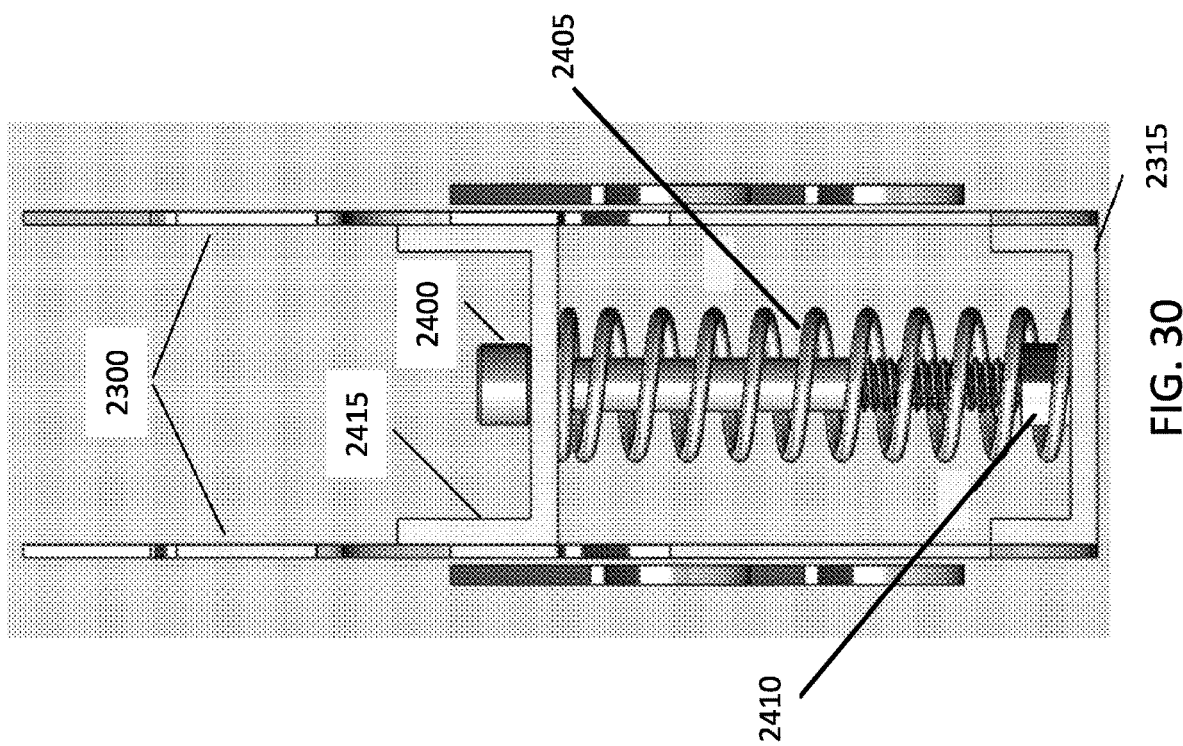
FIG. 30 is an illustration of the front of the head mount shown in FIG. 28.
Figure 31:
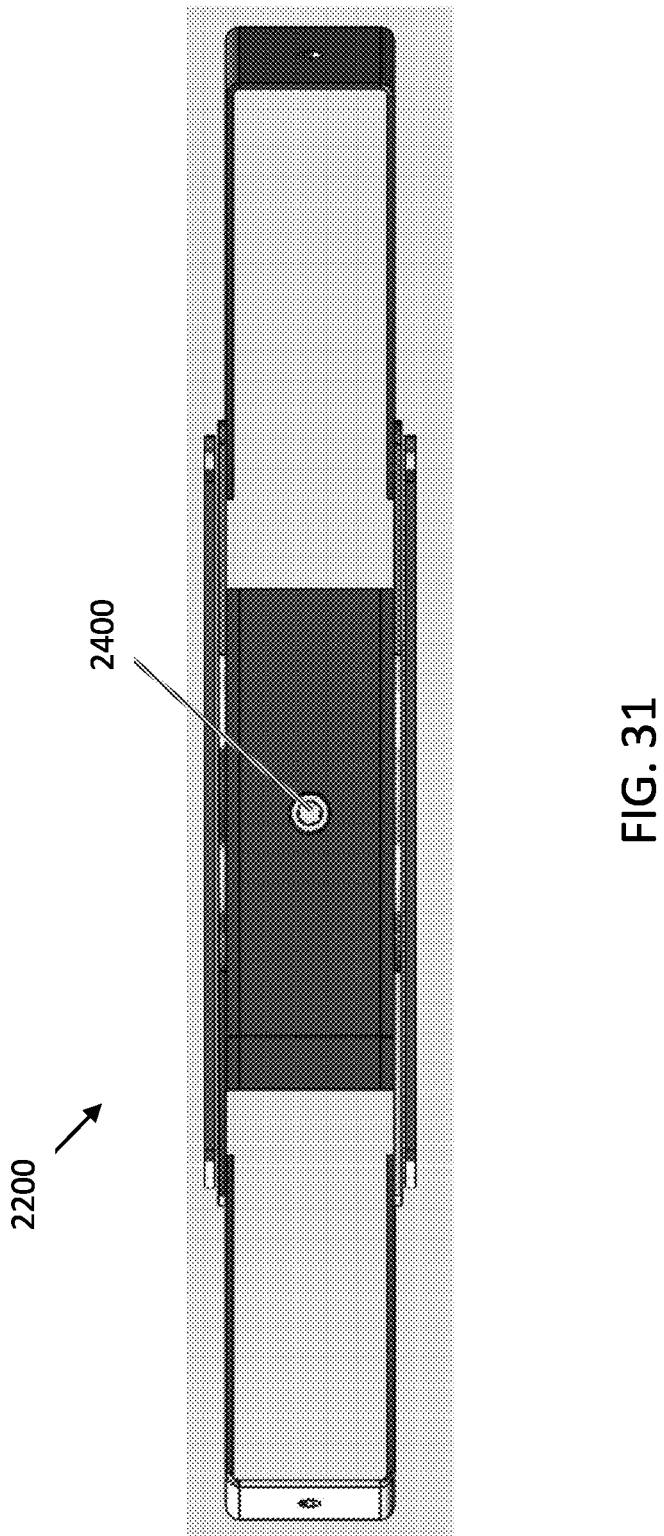
FIG. 31 is an illustration of the top of the head mount shown in FIG. 28.

As can be seen from FIG. 30, the plates 2300 are attached together by a member 2415 which is substantially similar to the base member 2315. A bolt 2400 connects the member 2415 to a nut 2410 that is attached to the base member 2315, and a spring 2405 surrounds the bolt 2400. The spring pushes against both the member 2415 and the base member 2315 to expand the head mount 2200, while the bolt 2400 limits the amount of possible expansion. In this way, the spring 2405 allows the head mount to exert sufficient pressure on, for example, the squeegee 2205, to form a seal between the squeegee 2205 and the surface of the solar collector. The spring 2405 is calibrated to exert the proper amount of force on the squeegee 2205 to ensure constant contact between the squeegee 2205 and the upper surface of the solar collector without "squishing" the squeegee against the top of the solar collector (and rendering the squeegee ineffective in removing liquid and debris). A top view of the head mount 2200 in FIG. 31 illustrates the access to the bolt 2400 which can be tightened or loosened in order to allow the appropriate amount of expansion in the head mount 800.

Figure 32:
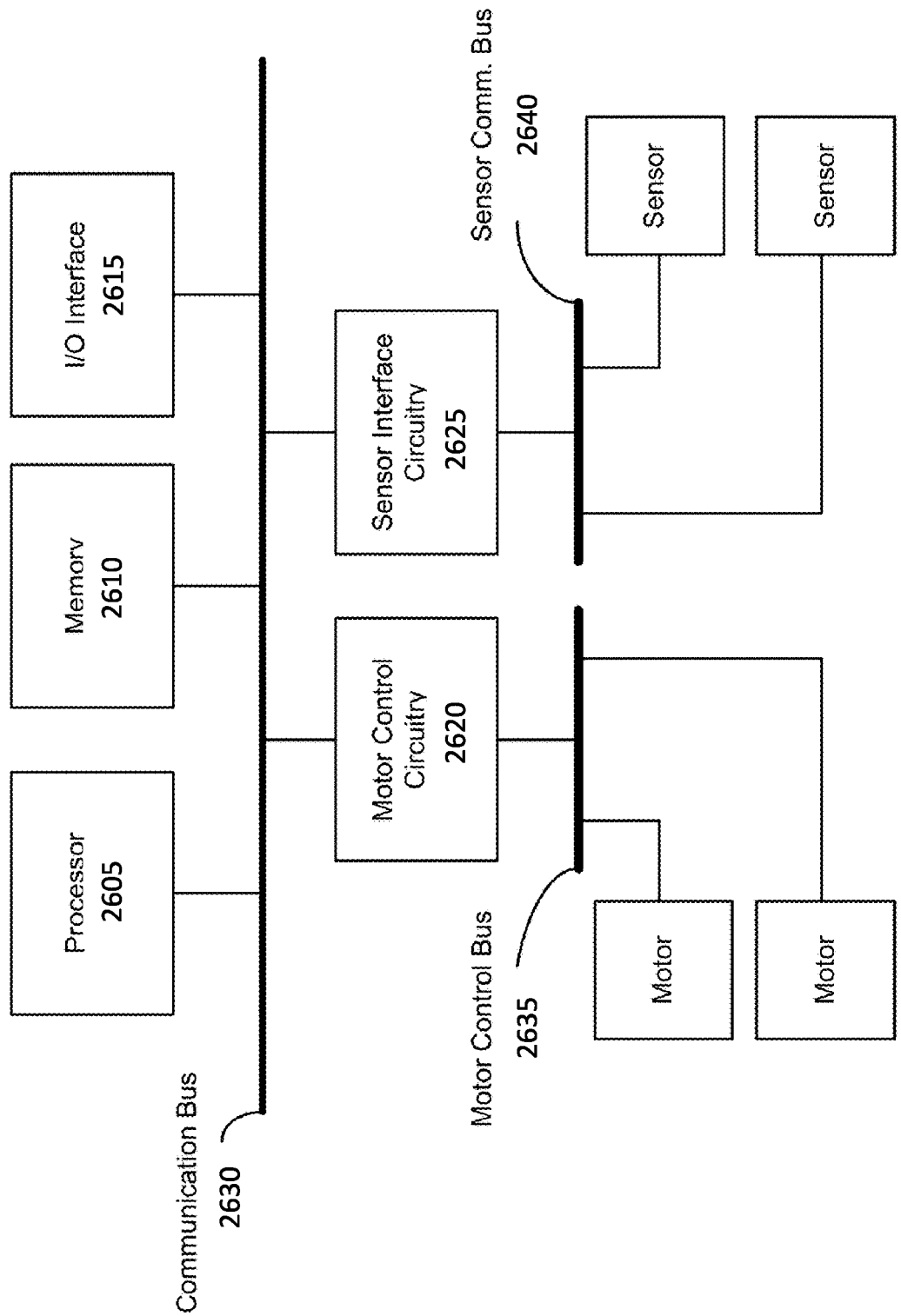
FIG. 32 is a schematic drawing of an example of control circuitry for the device shown in FIG. 21.

FIG. 32 is a schematic drawing of the control unit 1520 of the device 1900 according to exemplary aspects of the present disclosure. The control unit 1520 includes a processor 2605 which can be an embedded microcontroller, a general purpose CPU, or a circuit specifically designed for the device 1900 such as an FPGA or ASIC. The processor 2605 communicates with the other components of the control unit 1520 via a communication bus 2630, which may use any protocol known in the art, for example, UART, USB, CAN, etc. A memory 2610 is also connected to the communication bus 2630 to store data and programming instructions used by the processor 2605. The memory may be any combination of RAM, ROM, EEPROM, SRAM, FLASH, etc., and at least a portion of the memory may be removable.

The control unit 1520 also includes a sensor interface circuit 2625 which is connected to the communication bus 2630, and which is used to communicate with the sensors 1605. This circuit includes all necessary components, such as filters, amplifiers, etc., to communicate with the sensors 1605. The sensor interface circuit 2625 communicates with the sensors 1605 via a sensor communication bus 2640, which may be a wired bus that employs any of the protocols identified above, or may be a wireless bus that uses protocols such as Bluetooth, Zigbee, WiFi, etc., to wirelessly communicate with the sensors 1605. In the event that the sensor communication bus 2640 is wireless, the sensors 1605 are powered via a separate power source as can be appreciated by those skilled in the art. If the sensor communication bus is a wired bus, the sensors 1605 may derive power directly from the sensor communication bus 2640.

A motor control circuit 2620 is also connected to the communication bus 2630. The motor control circuit 2620 includes all necessary circuits to control the electric motors of the drive units 1505, such as amplifiers, filters, and may implement control using lead, lag, lead/lag, PID and other control architectures as would be recognized by those skilled in the art. The motor control circuit 2620 communicates with the electric motors of the drive units 1505 via a motor control bus 2635 which may be a 24 VDC bus through which power is supplied to the electric motors according to the control parameters provided to the motor control circuit 2620 by the processor 2605 via the communication bus 2630.

Figure 33:
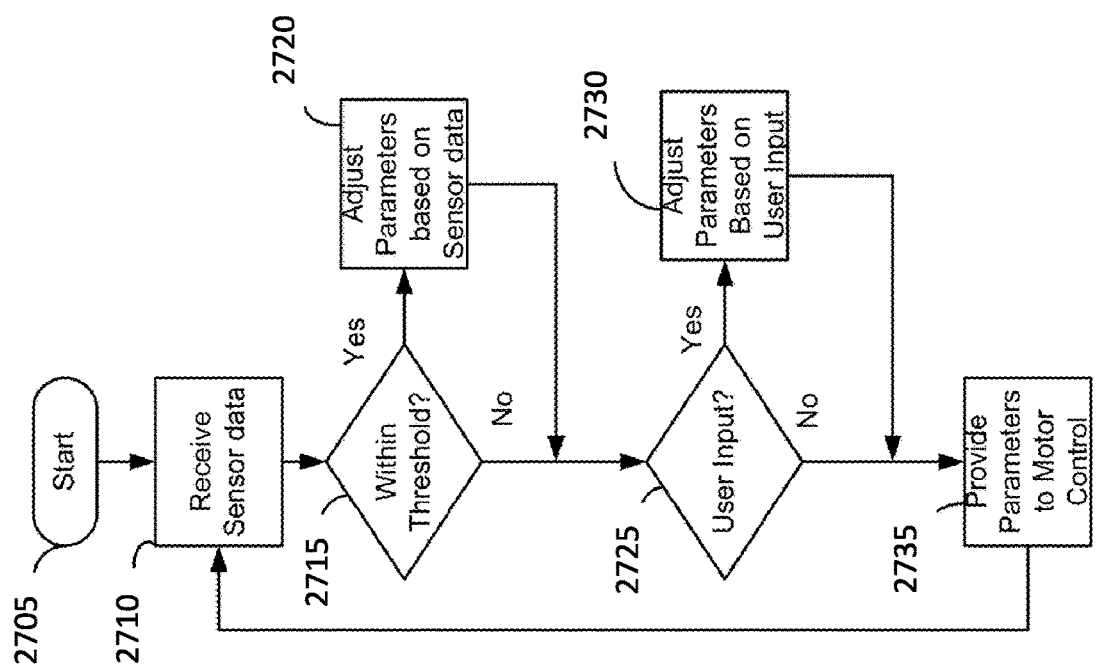
FIG. 33 is an example of a flow chart of a process that may be carried out by the control circuitry shown in FIG. 32.

Next, a description of the process performed by the control unit 1520 to ensure proper alignment of the device 1900 during cleaning of a solar collector is provided with reference to FIG. 33. The process begins at step 2705 and proceeds to step 2710 in which sensor data is received from the sensors. The sensor data is analyzed at step 2715 to determine whether adjustment is needed. The analysis may include, for example, comparison of the difference in edge detection by both sensors 1605 to a predetermined threshold.

If adjustment is not needed, the process moves to step 2725 in which it is determined whether user input is received. The user input may be a direction to cause the device 1900 to move up/down a face of a solar collector, to stop, to move, etc. Thus, the user input is a general directive to the device 1900, and the fine motor control of the device 1900 is performed autonomously by the control unit 1520. If no user input is detected at step 2725, then the process moves to step 2735 where motor control parameters are provided by the processor 2605 to the motor control circuitry 2620 to control movement of the device 1900. Then the process reverts to step 2710.

If at step 2715 it is determined that adjustment is needed, then process moves to step 2720 to generate a new set of motor control parameters based on the difference in time between edge detection by the two sensors 1605. These parameters may adjust the speed and or direction of movement of one or both of the drive units 1505 in order to reduce the difference in time. Once the new parameters are generated, the process moves to step 2725 and follows the steps described above.

If at step 2725 it is determined that user input is received, the process moves to step 2730 to further adjust the control parameters based on the user input. Then the process moves to step 2735 to provide the adjusted parameters to the motor control circuit as described above.

Though in FIG. 33 the process is described using polling for receiving both sensor data and user input, other methods of receiving this data are also possible. For example, the process may be interrupt driven, especially with regard to user input which may be generated sporadically. The steps described with reference to FIG. 33 may also be performed in a different order than the one described, or even in reverse order. Therefore, FIG. 33 is merely an exemplary process and should in no way be interpreted as limiting upon the present disclosure.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such clauses are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

A reference herein to a patent document or any other matter identified as prior art, is not to be taken as an admission that the document or other matter was known or that the information it contains was part of the common general knowledge as at the priority date of any of the claims.

What is claimed is:

1. A solar collector cleaning device comprising:
   a main shaft extending along a longitudinal axis, the main shaft including a cleaning member that engages and cleans an upper surface of a solar collector;
   a first driver attached to the main shaft and a second driver attached to the main shaft, the first driver and the second driver configured to engage the solar collector and propel the first driver, the second driver, and the main shaft along the solar collector while the cleaning member engages and cleans the upper surface of the solar collector;
   sensors attached to the first driver and the second driver, the sensors configured to detect one or more edges of the solar collector; and
   a control unit configured to receive output from the sensors indicating detection of the one or more edges of the solar collector, the control unit configured to change operation of the first driver, the second driver, or both the first driver and the second driver in response to receiving the output from the sensors,
   wherein the cleaning member is curved and extends from a first end to a second end with a middle portion that is disposed ahead of the first end and the second end during movement of the cleaning member over the upper surface of the solar collector.

2. The solar collector cleaning device of claim 1, wherein the main shaft is configured to change length, and the control unit is configured to determine when to stop changing the length of the main shaft based on the output from the sensors.

3. The solar collector cleaning device of claim 1, wherein the control unit is configured to reduce a speed at which the first driver propels the first driver along the solar collector based on the output that is received from the sensors.

4. The solar collector cleaning device of claim 1, wherein the control unit is configured to increase a speed at which the first driver propels the first driver along the solar collector based on the output that is received from the sensors.

5. The solar collector cleaning device of claim 1, wherein the control unit is configured to determine a time difference between times that the sensors detected the one or more edges of the solar collector, the control unit configured to change operation of the first driver, the second driver, or both the first driver and the second driver based on the time difference.

6. The solar collector cleaning device of claim 1, wherein the first driver and the second driver each include an upper wheel configured to engage the upper surface of the solar collector and a lower wheel configured to engage a lower surface of the solar collector that is opposite the upper surface, wherein the lower wheels are configured to be rotated by the first driver and the second driver while the upper wheels are not configured to be rotated by the first driver and the second driver.

7. A solar collector cleaning device comprising:
   a main shaft extending along a longitudinal axis, the main shaft including a cleaning member that engages and cleans an upper surface of a solar collector;
   a first driver attached to the main shaft and a second driver attached to the main shaft, the first driver and the second driver configured to engage the solar collector and propel the first driver, the second driver, and the main shaft along the solar collector while the cleaning member engages and cleans the upper surface of the solar collector;
   sensors attached to the first driver and the second driver, the sensors configured to detect one or more edges of the solar collector; and
   a control unit configured to receive output from the sensors indicating detection of the one or more edges of the solar collector, the control unit configured to change operation of the first driver, the second driver, or both the first driver and the second driver in response to receiving the output from the sensors,
   wherein the control unit is configured to determine a time difference between times that the sensors detected the one or more edges of the solar collector, the control unit configured to change operation of the first driver, the second driver, or both the first driver and the second driver based on the time difference.

8. The solar collector cleaning device of claim 7, wherein the main shaft is configured to change length, and the control unit is configured to determine when to stop changing the length of the main shaft based on the output from the sensors.

9. The solar collector cleaning device of claim 7, wherein the control unit is configured to reduce a speed at which the first driver propels the first driver along the solar collector based on the output that is received from the sensors.

10. The solar collector cleaning device of claim 7, wherein the control unit is configured to increase a speed at which the first driver propels the first driver along the solar collector based on the output that is received from the sensors.

11. The solar collector cleaning device of claim 7, wherein the first driver and the second driver each include an upper wheel configured to engage the upper surface of the solar collector and a lower wheel configured to engage a lower surface of the solar collector that is opposite the upper surface, wherein the lower wheels are configured to be rotated by the first driver and the second driver while the upper wheels are not configured to be rotated by the first driver and the second driver.

12. The solar collector cleaning device of claim 7, wherein the cleaning member is curved and extends from a first end to a second end with a middle portion that is disposed ahead of the first end and the second end during movement of the cleaning member over the upper surface of the solar collector.

* * * * *